(12) United States Patent
Leek et al.

(10) Patent No.: US 7,958,690 B2
(45) Date of Patent: Jun. 14, 2011

(54) STITCHING SYSTEM HOLD-DOWN

(75) Inventors: William F. Leek, Carmel, CA (US);
Aram Khachadourian, Modesto, CA (US); Jin Jie Lin, Livermore, CA (US)

(73) Assignee: Simpson Strong-Tie Co., Inc., Pleasanton, CA (US)

( * ) Notice: Subject to any disclaimer, the term of this patent is extended or adjusted under 35 U.S.C. 154(b) by 1253 days.

(21) Appl. No.: 10/909,862

(22) Filed: Aug. 2, 2004

(65) Prior Publication Data

US 2006/0021291 A1 Feb. 2, 2006

Related U.S. Application Data

(60) Provisional application No. 60/608,942, filed on Oct. 24, 2003.

(51) Int. Cl.
*E04C 5/12* (2006.01)
(52) U.S. Cl. ............... 52/702; 52/698; 52/295; 52/166; 52/712; 403/198
(58) Field of Classification Search .............. 52/698, 52/293.1, 295, 702, 714, 166; 403/190, 232.1
See application file for complete search history.

(56) References Cited

U.S. PATENT DOCUMENTS

| | | |
|---|---|---|
| 1,945,925 A | 2/1934 | Stiefel |
| 2,321,221 A | 6/1943 | Linehan |
| 2,413,362 A | 12/1946 | Maxwell et al. |
| 2,625,815 A | 1/1953 | Black et al. |
| 2,723,815 A | 11/1955 | Browning |

(Continued)

FOREIGN PATENT DOCUMENTS

DE 296 10 381 U1 10/1996

(Continued)

OTHER PUBLICATIONS

PHD Predeflected Holdowns, Simpson Strong-Tie Co., Inc. Catalog C-2000, pp. 20-21.

(Continued)

*Primary Examiner* — Eileen Lillis
*Assistant Examiner* — Alp Akbasli
(74) *Attorney, Agent, or Firm* — Vierra Magen Marcus & DeNiro LLP

(57) ABSTRACT

A coupling system for securing an elongated wood member having a surface to a second body comprises a stitching body having a first end and a second end defining a length, and a first side and a second side. A first plurality of angled fastener bores is positioned generally on the first side of the stitching body, each configured to position a first side fastener element resting therein at least a first angle with respect to the surface of the elongated wood member. A second plurality of angled fastener bores positioned generally on the second side of the stitching body, each configured to position a second side fastener element resting therein at least a second angle with respect to the surface of the elongated wood member, such that ones of said second side fasteners and said first side fasteners form an intersection when viewed along the length of the stitching body. In one aspect, the coupling system is a hold-down securing a column having a surface to a foundation. The hold-down includes an anchor securing section securing an anchor bolt having a first end positioned in a foundation, the securing section having a first side and a second side defining a width, and a first end and a second end defining a length. A method for installing a hold-down is also provided.

17 Claims, 16 Drawing Sheets

U.S. PATENT DOCUMENTS

| | | | |
|---|---|---|---|
| 2,911,690 A | | 11/1959 | Sanford |
| 3,256,030 A | | 6/1966 | Banse |
| 3,967,908 A | | 7/1976 | Snow |
| 4,032,242 A | | 6/1977 | Morris |
| 4,198,175 A | | 4/1980 | Knepp et al. |
| 4,410,294 A | | 10/1983 | Gilb et al. |
| 4,480,941 A | | 11/1984 | Gilb et al. |
| 4,572,695 A | | 2/1986 | Gilb |
| 4,589,792 A | | 5/1986 | Niziol |
| 4,714,372 A | | 12/1987 | Commins |
| 4,932,173 A | | 6/1990 | Commins |
| 4,965,980 A | | 10/1990 | Leavens |
| 4,976,085 A | | 12/1990 | Krueger |
| 5,109,646 A | | 5/1992 | Colonias et al. |
| 5,150,982 A | | 9/1992 | Gilb |
| 5,160,211 A | | 11/1992 | Gilb |
| 5,259,685 A | | 11/1993 | Gilb |
| 5,274,981 A | | 1/1994 | Commins |
| 5,328,287 A | | 7/1994 | Gilb |
| 5,419,649 A | | 5/1995 | Gilb |
| 5,603,580 A | | 2/1997 | Leek et al. |
| 5,653,079 A | | 8/1997 | Loeffler et al. |
| 5,664,389 A | * | 9/1997 | Williams ............... 52/677 |
| 5,761,863 A | | 6/1998 | Sutt, Jr. et al. |
| 5,813,181 A | | 9/1998 | Ashton et al. |
| 5,836,131 A | | 11/1998 | Viola et al. |
| H1795 H | | 7/1999 | Leek |
| 5,921,042 A | | 7/1999 | Ashton et al. |
| 5,979,130 A | | 11/1999 | Gregg et al. |
| 6,006,487 A | | 12/1999 | Leek |
| 6,112,486 A | | 9/2000 | Ashton et al. |
| 6,176,057 B1 | | 1/2001 | Bouchet et al. |
| 6,230,467 B1 | | 5/2001 | Leek |
| 6,250,041 B1 | * | 6/2001 | Seccombe ............... 52/712 |
| 6,260,402 B1 | | 7/2001 | Leek |
| 6,295,780 B1 | | 10/2001 | Thompson |
| 6,295,781 B1 | | 10/2001 | Thompson |
| 6,425,220 B1 | | 7/2002 | Ashton et al. |
| 6,446,409 B1 | | 9/2002 | Emerson |
| 6,513,290 B2 | | 2/2003 | Leek |
| 6,550,200 B1 | | 4/2003 | Mueller |
| 6,560,940 B2 | | 5/2003 | Mueller |
| 6,625,945 B2 | | 9/2003 | Commins |
| 6,698,971 B1 | | 3/2004 | Wilhelmi |
| 6,715,258 B1 | * | 4/2004 | Mueller ............... 52/745.12 |
| 2001/0002529 A1 | * | 6/2001 | Commins et al. ........... 52/481.1 |
| 2002/0002806 A1 | * | 1/2002 | Commins et al. ........... 52/481.1 |
| 2002/0020137 A1 | | 2/2002 | Commins |
| 2002/0066247 A1 | | 6/2002 | Leek |
| 2004/0065032 A1 | | 4/2004 | Commins |
| 2004/0079034 A1 | | 4/2004 | Leek |
| 2007/0110513 A1 | * | 5/2007 | Fujihashi et al. ........ 403/364 |

FOREIGN PATENT DOCUMENTS

| | | |
|---|---|---|
| DE | 299 03 749 U1 | 7/1999 |
| DE | 100 36 754 C1 | 6/2002 |
| EP | 0745735 | 4/1996 |
| GB | 2 026 644 | 2/1980 |

OTHER PUBLICATIONS

Face Mount EWP Hangers, United Steel Products Company, 1998.
USP Design Binders, United Steel Products Company, 1998.
Multi-Purpose Joist Hangers—JH series, United Steel Products Company Full Line Catalog 2000, p. 51.
Simpson Strong-Tie Company, Inc. "H Seismic and Hurricane Ties", Catalog C-2005, p. 132, Masonry Connectors.
A. Maher, "Engineered Nailing Simplifies Framing," pp. 137-140, Aug. 1964.
Hughes Manufacturing, Inc. "Product Catalog, 1996/1997," Zambetti Steel Products, Inc. (Jacksonville, Florida), pp. 17, 35, 1996.
Lumberlok Engineered Metal Fasteners, "Truss-to-truss Conenctions," Division of Gang-Nail Canada Inc., p. 23, (as early as Nov. 20, 1990).
Simpson Strong-Tie Company, Inc. "Catalog C-2002," CCC/CCT/ECCL Alternate Options, p. 43, Top Flange Hangers, p. 55, LTP4 Framing Angles and Plates, p. 139, 2001.
United Steel Products Company, "SBCCI Public Safety Testing and Evaluation Services Inc. Evaluation Report No. 2031A," Category: Hangers and Supports, pp. 1-23, 2001.
United Steel Products Company, "Lumber Connectors," USP Full Line Catalog, pp. 64, 132, 1998.
United Steel Products Company, "Structural Connectors," Truss & Rafter, pp. 56-57, 2003.
BMF Bygningsbeslag a/s, "Handvaerkerkatalog," (total of 2 pages), 1989.
BMF-Simpson Bausysteme Fur Holz, Simpson Strong-Tie Connectors, "Statische Werte," pp. 5, 22-26, 30, 39, 57-58, 2002.
W. Leek, "Gusset Angle Corner Connection," United States Statutory Invention Registraion No. H1,795, published Jul. 6, 1999.
Examiner's Report dated Jun. 2, 2009, Australian Application No. 2004222836.
Communication pursuant to Article 94(3) EPC dated Jul. 16, 2010, European Application No. 04256517.6.
Amendment dated Jan. 5, 2011, Japanese Application No. 2004-338164.
Amendment dated Feb. 25, 2011, Australian Application No. 2004222836.

* cited by examiner

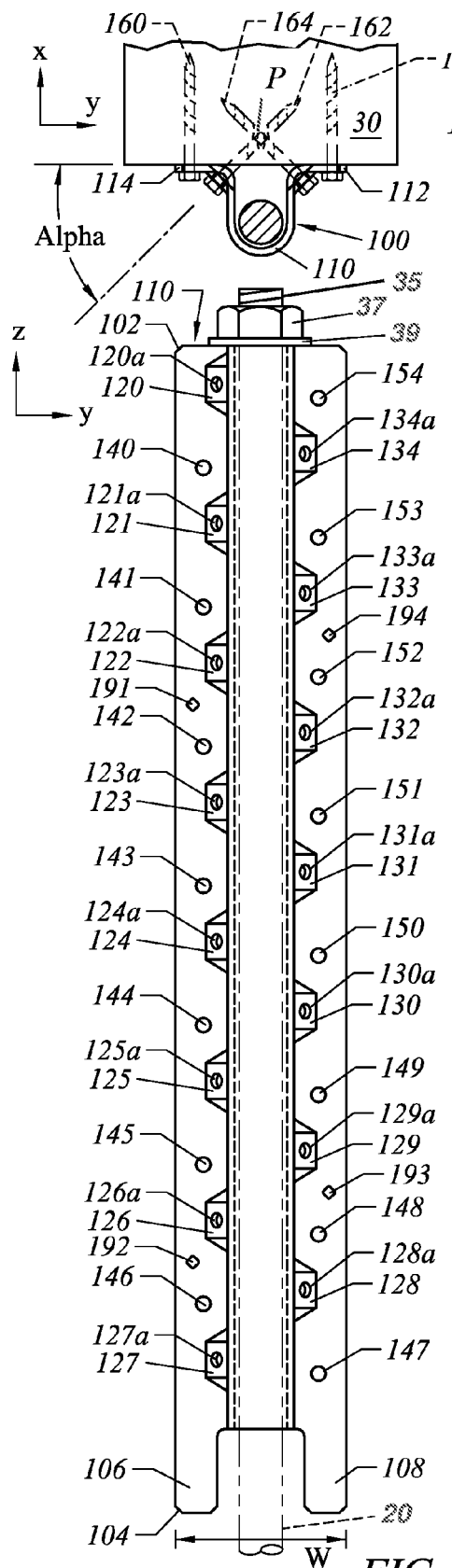
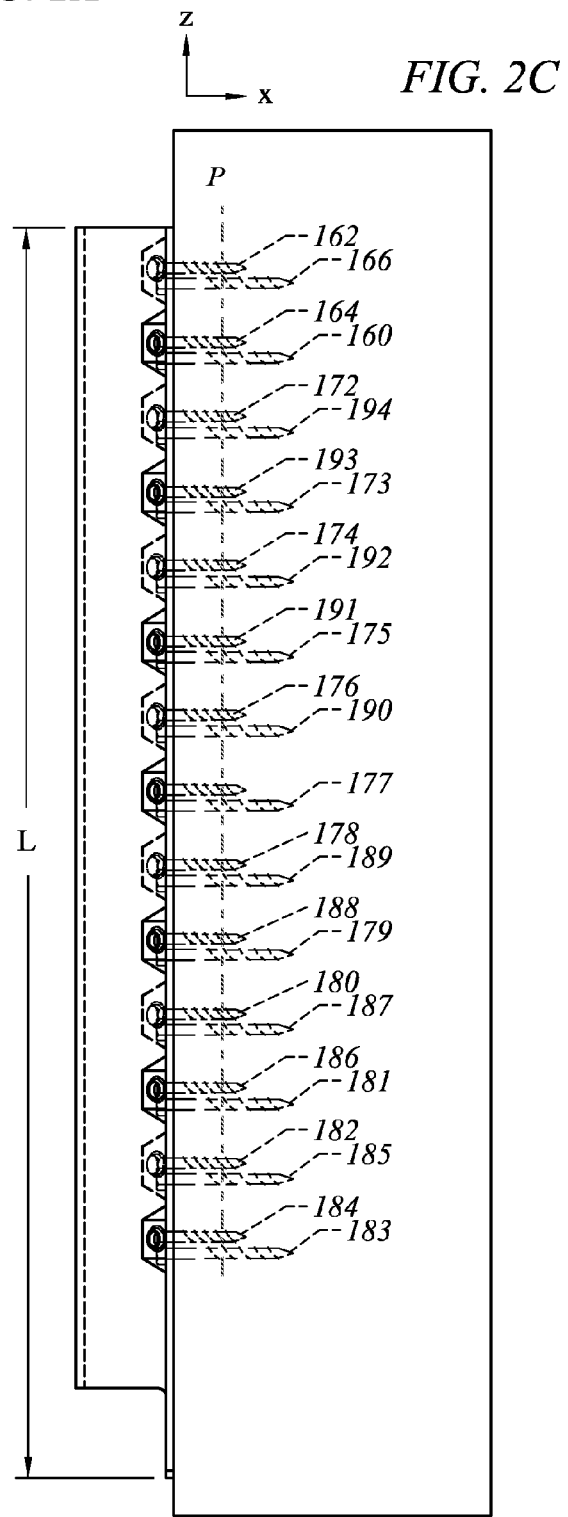
FIG. 2A
FIG. 2B
FIG. 2C

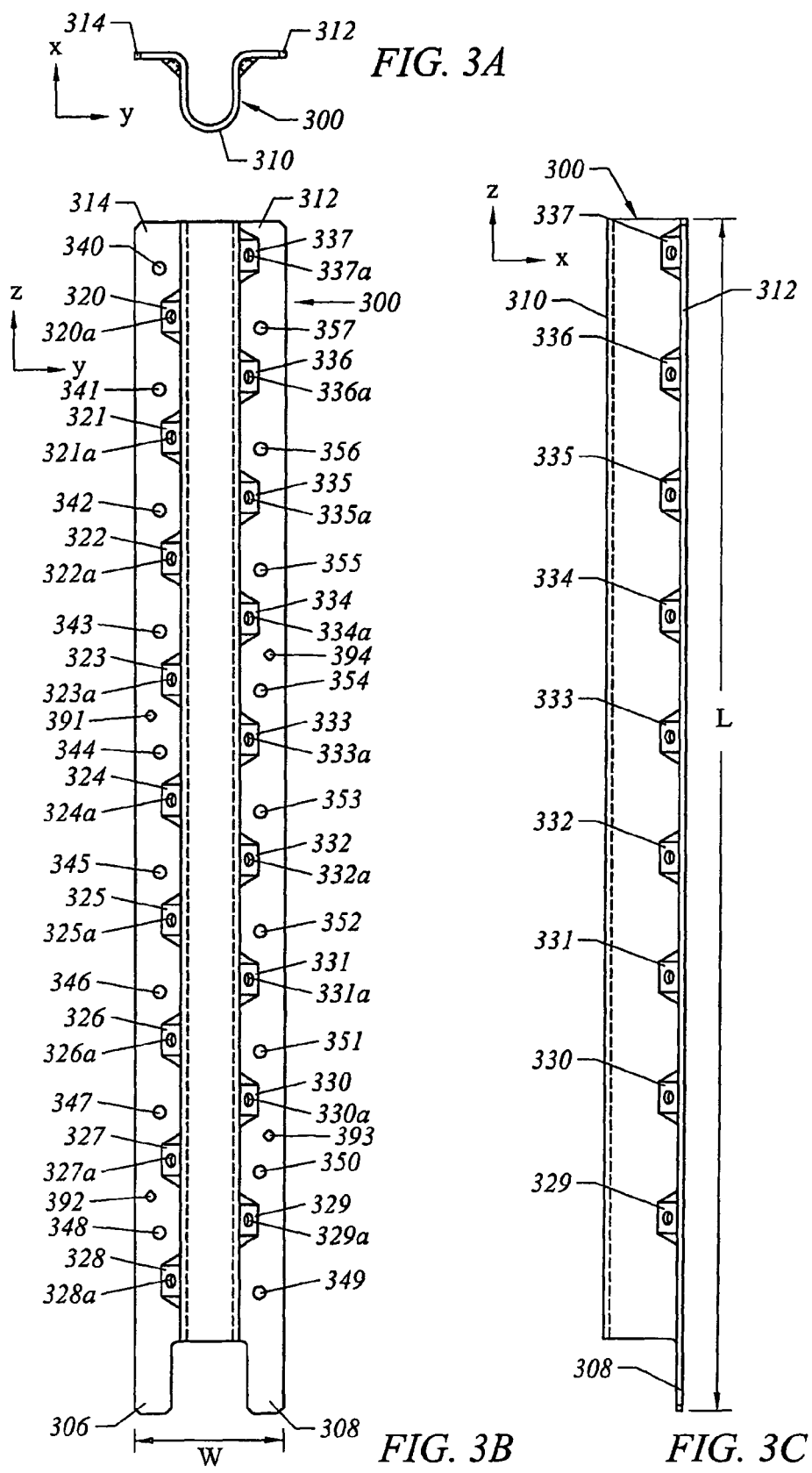

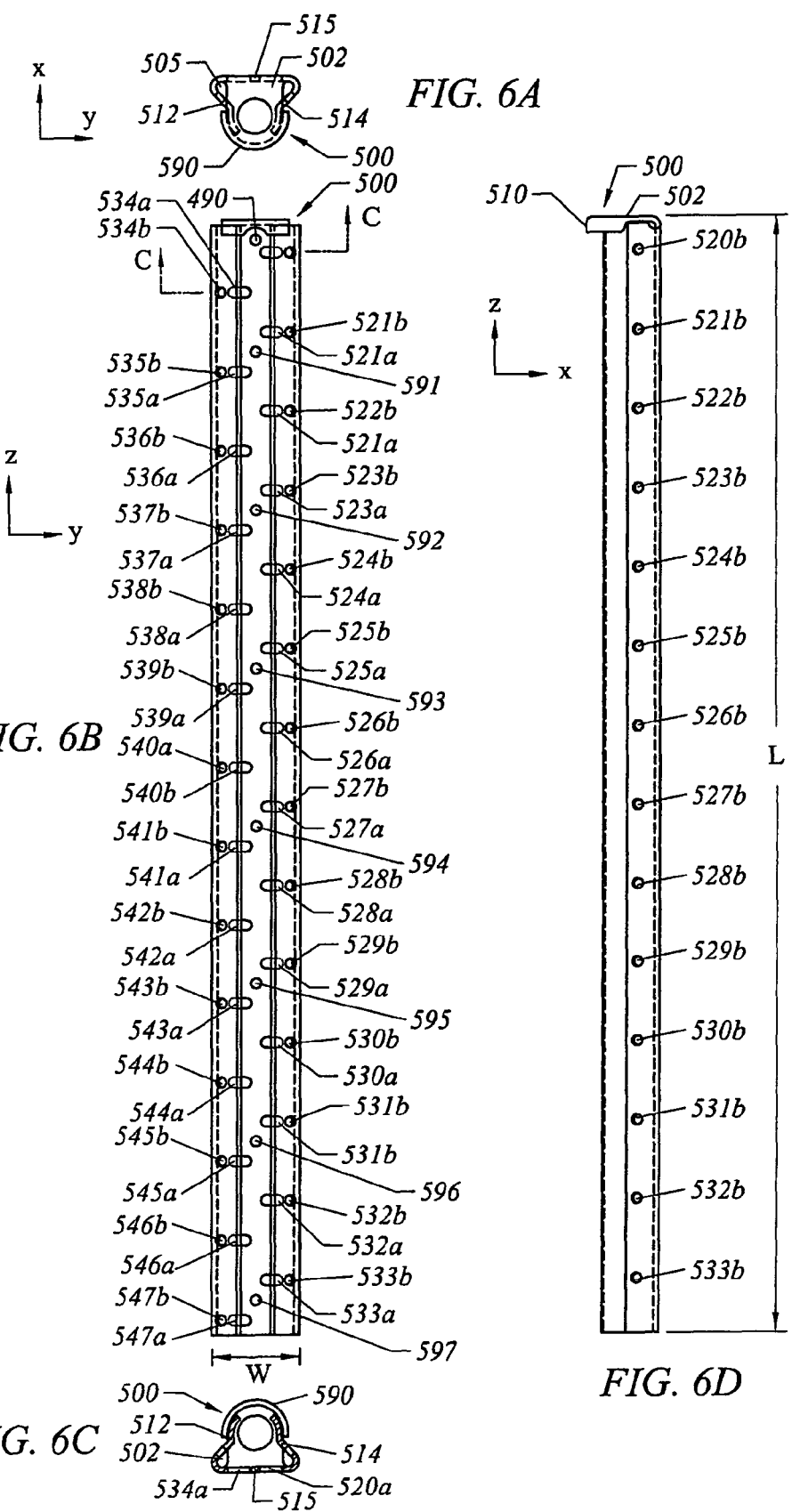

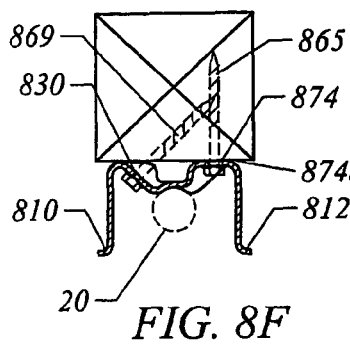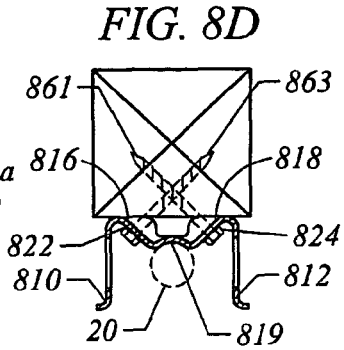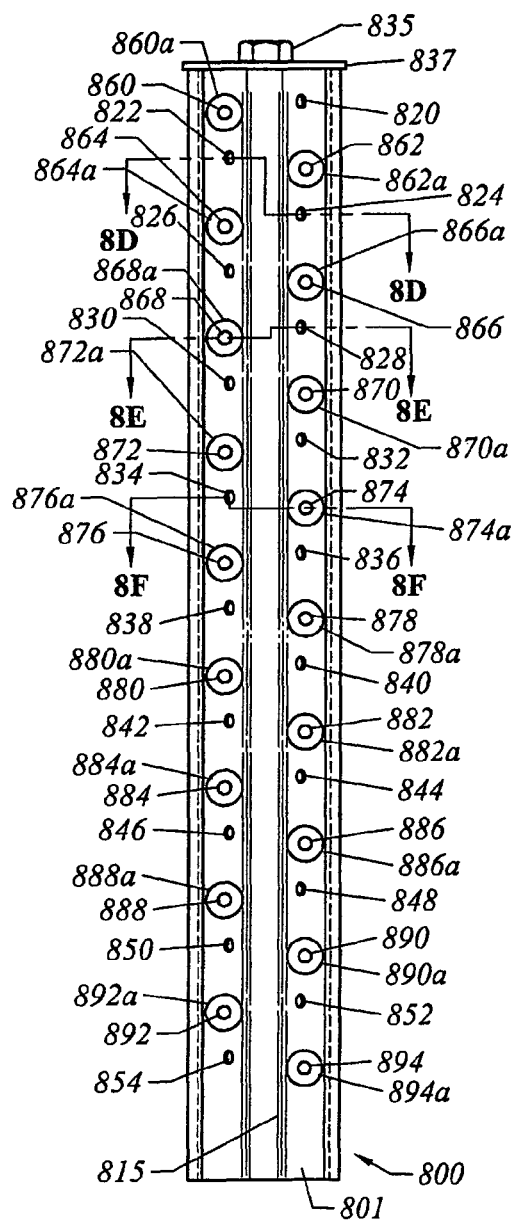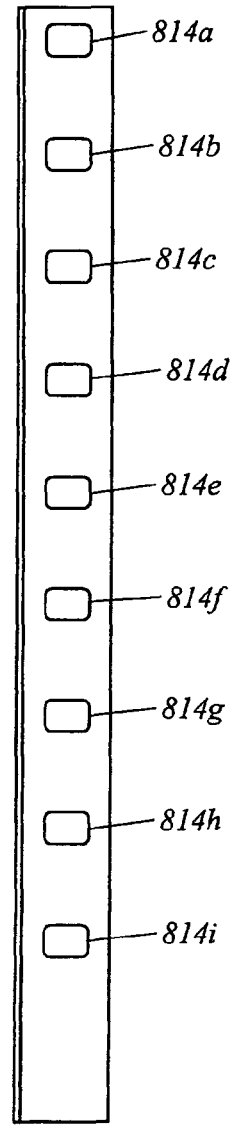

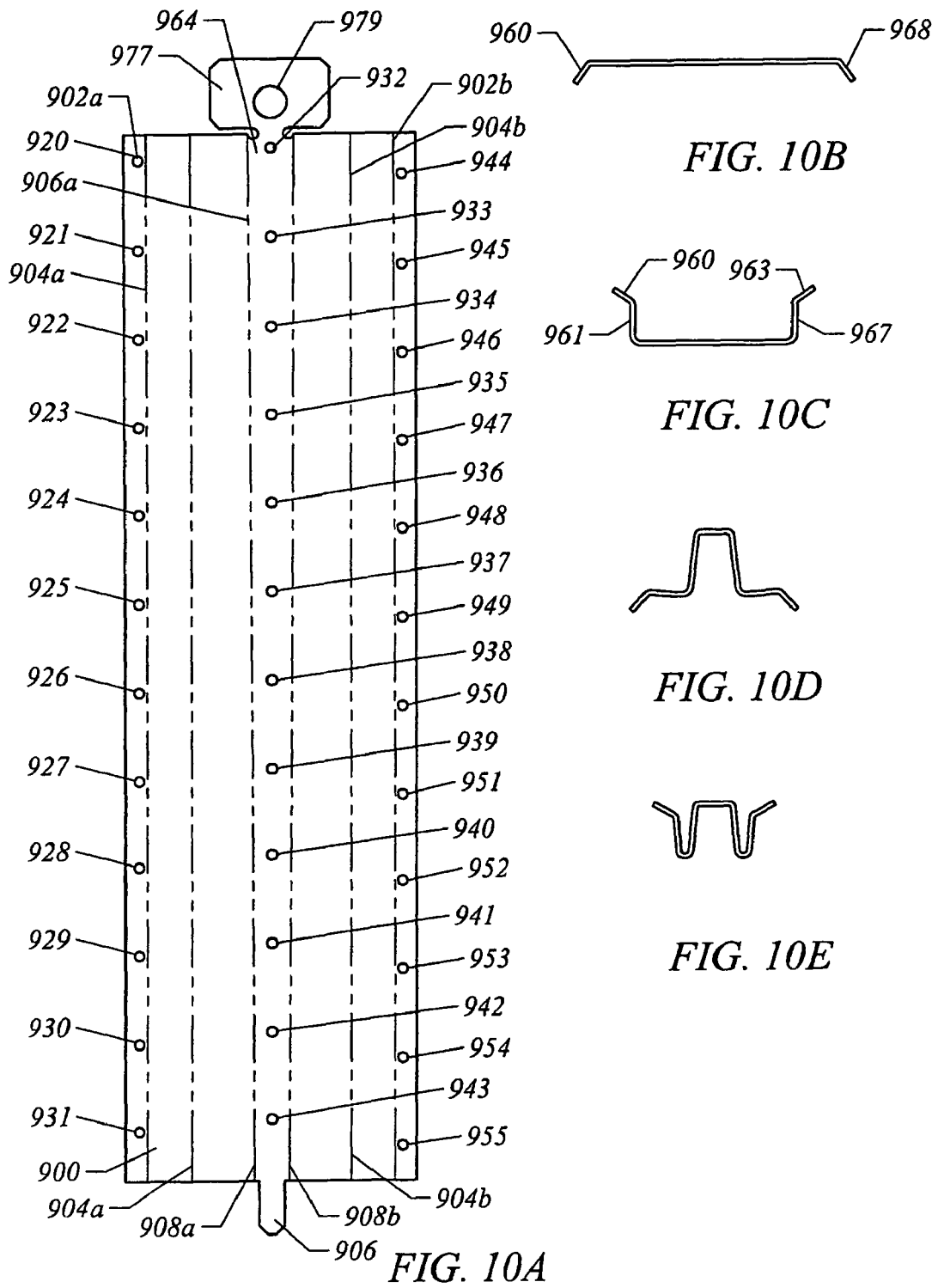

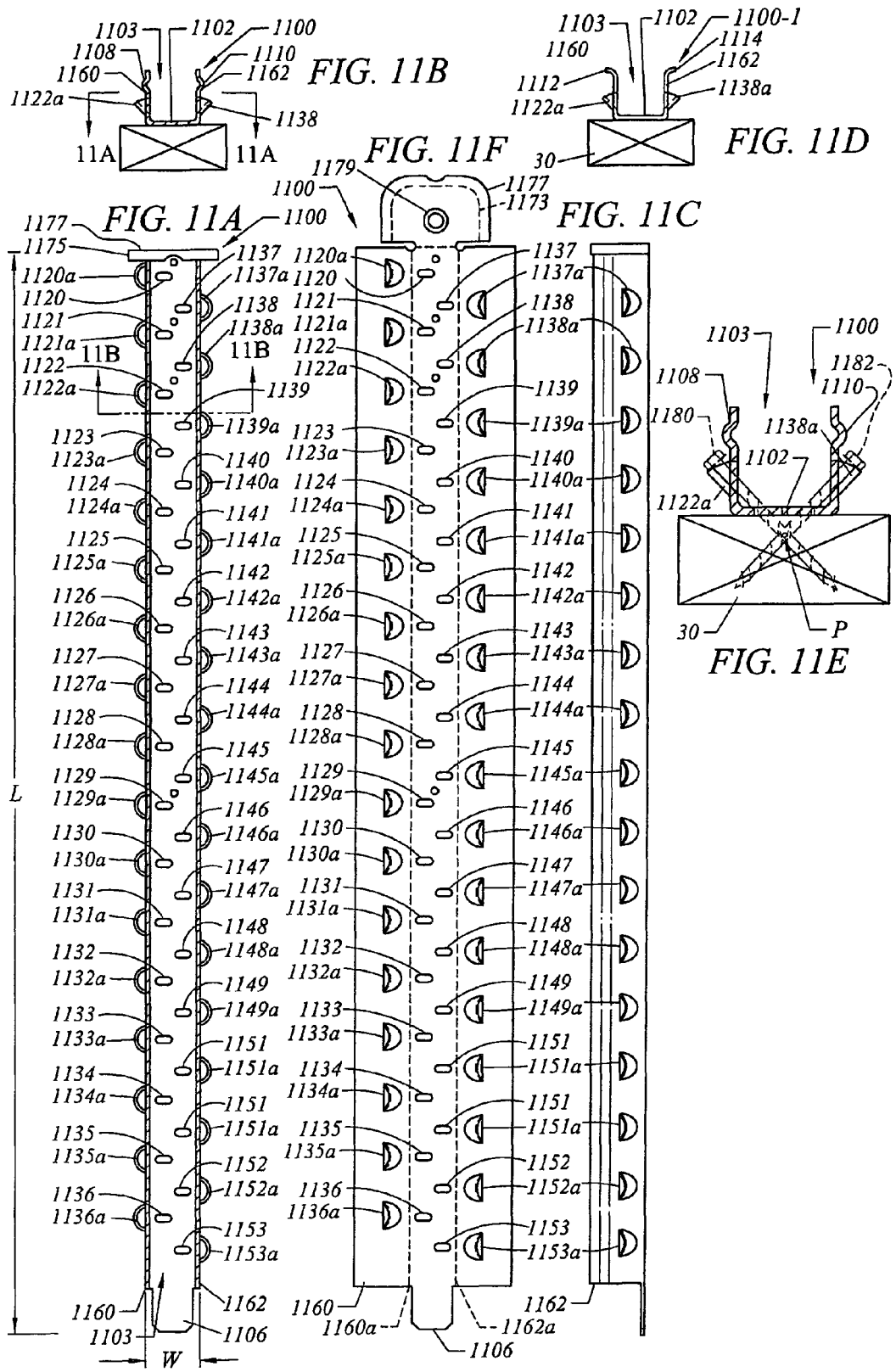

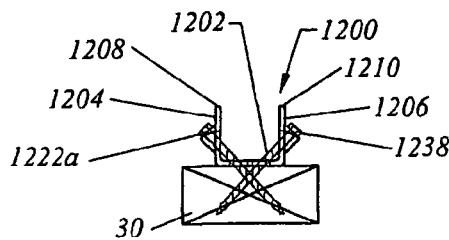
FIG. 12B
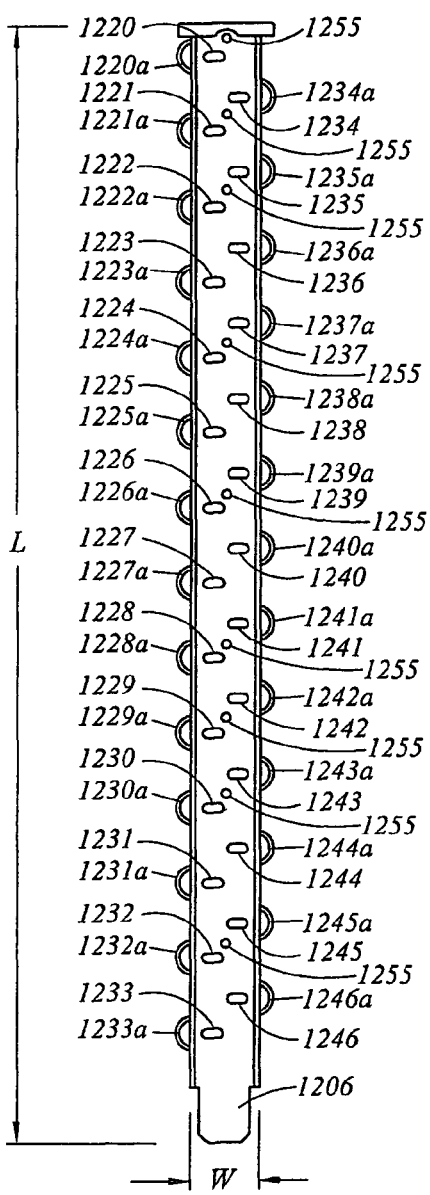
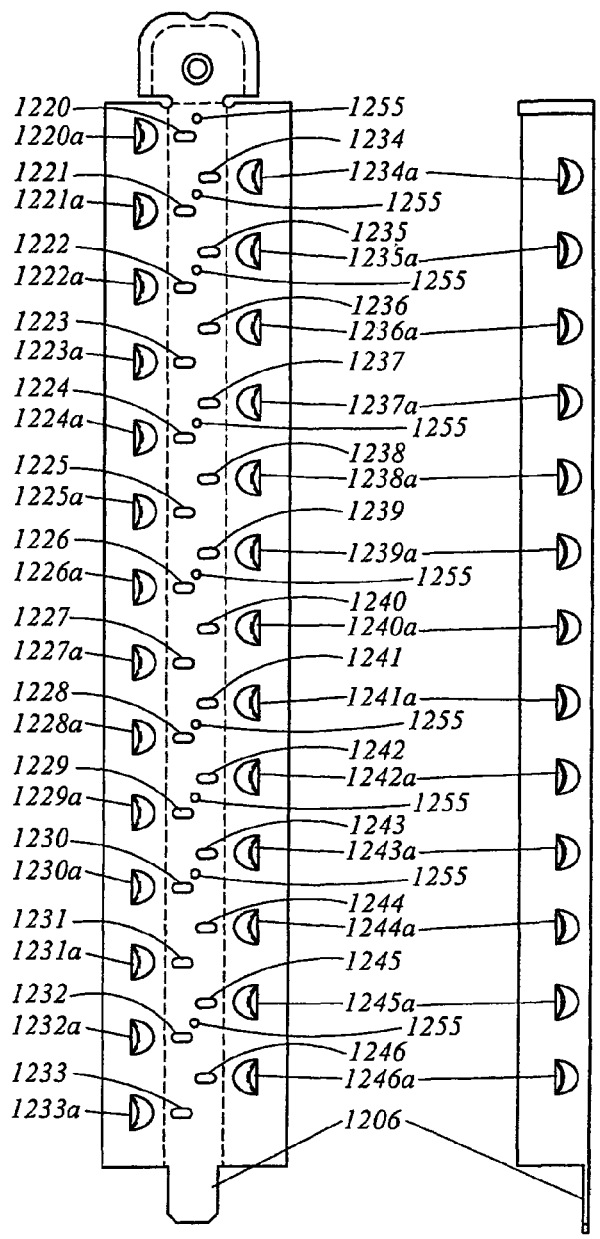
FIG. 12A      FIG. 12C      FIG. 12D

STITCHING SYSTEM HOLD-DOWN

CLAIM OF PRIORITY

This application claims the benefit of U.S. Patent Application No. 60/608,942, "Stitching System Hold-Down," filed on Oct. 24, 2003, by William F. Leek, which is incorporated herein by reference.

BACKGROUND OF THE INVENTION

1. Field of the Invention

The present invention is directed to an improved construction device, and specifically an improved hold-down device for building construction applications.

2. Description of the Related Art

Nature's elements exert extreme forces on building walls and elements. High winds and earthquakes, in particular, cause forces that place considerable strain on the stability of a building. Proper distribution of these forces is critical to ensure the stability of a structure. At the core of building stability is the building's foundation and thus securing the walls of a building to the foundation greatly improves structural performance.

Structures known as "hold-downs" are used to transfer tension loads between floors, to tie purlins to masonry or concrete, and in other applications. The loads may then be resolved in the foundation, where they appear as tension and compression forces.

Buildings are often composed of long walls, (walls with a length greater than the height) and short walls (walls that have a length shorter than the height). The tendency for a wall to lift vertically off a foundation is inversely proportional to the length of the wall. Tall narrow shear walls, which may be found in nearly all homes, act as lever arms or cantilevers, and magnify imposed loads. Horizontal loads are magnified when resolved into vertical components. In certain instances, the actual load on the support system may be magnified to several times the originally imposed load.

There are a number of sources of deflection at hold-down connections. For example, bolt slip can occur at hold-down stud bolts. When a hold-down is installed on only one side of the stud, an eccentricity exists during loading which can cause more movement in the wall system. Wood at the end of the studs (sill plates, rim joists, etc.) may crush under normal dead and live loading; additional compressive forces due to overturning during earthquake and high wind loads add to the deflection. Other sources of deflection exist and the foregoing is illustrative only.

Hold-downs are therefore required to resist a substantial amount of force to be effective. In addition, hold-downs need to be easy to install and inexpensive to fabricate. Accordingly, a need exists for a balanced hold-down that may be easily installed.

SUMMARY OF THE INVENTION

The present invention, roughly described, pertains to a coupling system for securing an elongated wood member having a surface to a second body. The coupling system comprises a stitching body having a first end and a second end defining a length, and a first side and a second side. A first plurality of angled fastener bores is positioned generally on the first side of the stitching body, each configured to position a first side fastener element resting therein at least a first angle with respect to the surface of the elongated wood member. A second plurality of angled fastener bores positioned generally on the second side of the stitching body, each configured to position a second side fastener element resting therein at least a second angle with respect to the surface of the elongated wood member. Ones of said second side fasteners and said first side fasteners form an intersection in the wood member when viewed along the length of the stitching body.

In another embodiment, the invention is a hold-down system. In one aspect, the invention comprises a hold-down system coupling a building support to a foundation. The hold-down includes a body having a first end and a second end, and a first side and a second side. A first plurality of angled fastener bores positioned on the first side of the body are provides, as well as a second plurality of angled fastener bores positioned on the second side of the body. A plurality of perpendicular fastener bores are also provided. One of said plurality of perpendicular fastener mounting bores is associated with at least one of said first or second plurality of angled fastener bores and each set of associated perpendicular and angled bores is spaced apart along said body between said first end and said second end.

In another aspect, the hold-down system includes a body having a first end and a second end, and including a first flange and a second flange. A plurality of angular dowel fastener positioning structures each including an angular bore are positioned on a first side of the anchor holding section. A second plurality of angular dowel fastener positioning structures each including an angular bore are positioned on the second side of the anchor holding section. A first plurality of perpendicular dowel mounting bores are positioned on a first flange and a second plurality of perpendicular dowel mounting bores are positioned on a second flange. In a unique aspect, the density of dowels positionable in said angular and perpendicular dowel mounting bores on each said flange is about one per two square inches.

In a further aspect, the invention is a hold-down securing a support to a foundation. The hold-down includes a body, the body having a securing section surrounding a portion of an anchor provided in the foundation, a length, a width, a top and a bottom. The width is defined by a first side and a second side. A first plurality of angled fastener positioning bores is provided in said first side and a second plurality of angled dowel fastener positioning bores is positioned in said second side. A first plurality of generally perpendicular fastener bores is provided on said first side, ones of said first plurality of generally perpendicular dowel fastener bores are interposed with ones of said first plurality of angled dowel fasteners. A second plurality of generally perpendicular fastener bores is provided on said second side, with ones of said second plurality of generally perpendicular dowel fastener bores being interposed with ones of said second plurality of angled dowel fasteners. In addition, ones of the first and second angled dowel fasteners are provided a spaced distance apart on alternating sides of the securing body along the length of the body.

In a still further aspect, the invention is a hold-down securing a column or member having a surface to a base such as foundation, mudsill or the like. The hold-down includes an anchor securing section securing an anchor member having a first end positioned in the base, the securing section having a first side and a second side defining a width, and a first end and a second end defining a length. A first plurality of dowel fastener positioning bores having a cross-section parallel with the surface of the column or member when the securing section abuts the column is provided. A second plurality of dowel fastener positioning bores having a cross-section angled with respect to the surface of the column or member when the securing section abuts the column or member is also provided. The number of said first plurality and second plurality of bores provides a density of at least one bore per two square inches.

In another aspect, the invention is a hold-down system securing a foundation to a support column in a building. The system includes an anchor body having a length, a width, a first side, and a second side, abutting the support column and securing a portion of an anchor having a second portion secured in the foundation. A first dowel fastener securing the hold-down on the first side of the anchor body and entering the support perpendicular to a surface of the support column is provided. A second dowel fastener securing the hold-down on the second side of the anchor body spaced laterally apart from said first dowel fastener along the width of the body and entering the support at a first angle relative to the surface of the support column is also provided. A third dowel fastener secures the hold-down on the second side of the anchor body, entering the support perpendicular to a surface of the support column, and spaced apart from said second dowel fastener along the length of the body. A fourth dowel fastener secures the hold-down on the first side of the anchor body spaced laterally apart from said third dowel fastener along the width of the body, spaced apart from said first dowel fastener along the length of said support anchor body, and entering the support at a second angle relative to the surface of the support column.

In another aspect, the invention is a method of installing a hold-down in a building foundation. The method includes the steps of: positioning the hold-down about an anchor member, the hold-down having a first side and a second side and securing the anchor member between the first side and the second side; attaching the hold-down to a building support member by: inserting a first plurality of dowel fasteners though the hold-down in an inter-digited perpendicular relationship on alternating sides of the anchor member to a surface of the support member; inserting a second plurality of dowel fasteners through the hold-down in an inter-digited angled relationship to the surface of the support member; and securing an anchor member to the hold-down.

These and other objects and advantages of the present invention will appear more clearly from the following description in which the preferred embodiment of the invention has been set forth in conjunction with the drawings.

BRIEF DESCRIPTION OF THE DRAWINGS

The invention will be described with respect to the particular embodiments thereof. Other objects, features, and advantages of the invention will become apparent with reference to the specification and drawings in which:

FIG. 2A is an end view of the first embodiment of a hold-down in accordance with the present invention.

FIG. 2B is an elevation view of the first embodiment of a hold-down in accordance with the present invention.

FIG. 2C is a side view of the first embodiment of a hold-down in accordance with the present invention.

FIG. 3A is an end view of the second embodiment of a hold-down in accordance with the present invention.

FIG. 3B is an elevation view of the second embodiment of a hold-down in accordance with the present invention.

FIG. 3C is a side view of the second embodiment of a hold-down in accordance with the present invention.

FIG. 6A is a first end view of the fourth embodiment of a hold-down in accordance with the present invention.

FIG. 6B is an elevation view of the fourth embodiment of a hold-down in accordance with the present invention.

FIG. 6C is a cut-away view of the fourth embodiment of a hold-down in accordance with the present invention.

FIG. 6D is a side view of the fourth embodiment of a hold-down in accordance with the present invention.

FIG. 8B is an elevation view of the fifth embodiment of a hold-down in accordance with the present invention.

FIG. 8C is a side view of the fifth embodiment of a hold-down in accordance with the present invention.

FIG. 8D is an end view of the fifth embodiment of a hold-down in accordance with the present invention FIG. 8E is a cross-sectional view of the fifth embodiment of a hold-down in accordance with the present invention.

FIG. 8F is a second cross-sectional view of the fifth embodiment of a hold-down in accordance with the present invention.

FIG. 10A is a plan view of the sixth embodiment of the hold-down shown in FIGS. 9A-9D prior to assembly.

FIGS. 10B-10E are end views of the sixth embodiment of the hold-down shown in FIGS. 9A-9D illustrating one assembly procedure for this embodiment.

FIG. 11A is an assembled, elevation view of the seventh embodiment of a hold-down in accordance with the present invention.

FIG. 11B is an assembled, end view of the seventh embodiment of a hold-down in accordance with the present invention.

FIG. 11C is an assembled, side view of the seventh embodiment of a hold-down in accordance with the present invention.

FIG. 11D is an assembled, end view of a second version of the seventh embodiment of a hold-down in accordance with the present invention.

FIG. 11E is an attached, assembled end view of the first version of the embodiment of FIG. 11A illustrating the fastener stitching pattern.

FIG. 11F is an un-assembled, elevation view of the seventh embodiment of the present invention.

FIG. 12A is an assembled, elevation view of the eighth embodiment of a hold-down in accordance with the present invention.

FIG. 12B is an assembled, end view of the eighth embodiment of a hold-down in accordance with the present invention.

FIG. 12C is an un-assembled view of the eighth embodiment of the present invention.

FIG. 12D is an assembled, side view of the eighth embodiment of a hold-down in accordance with the present invention.

DETAILED DESCRIPTION

The invention provides a unique apparatus for ensuring stability in a building by re-enforcing the attachment of an elongated wood column to a body, such as a building support to a building foundation. Various embodiments of the coupling system, provided in an exemplary embodiment of a hold-down, are included herein.

Figure 1A:
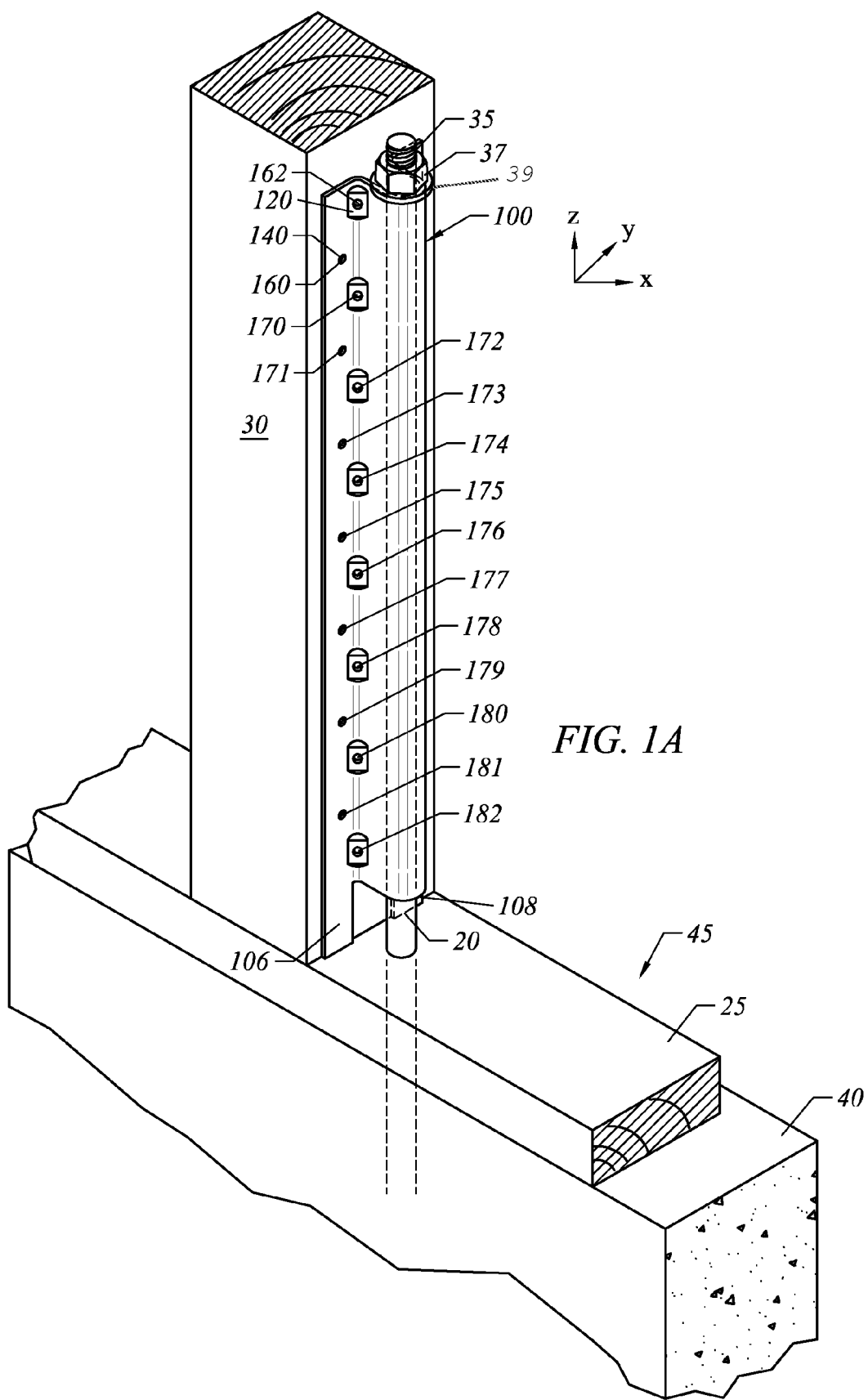
FIG. 1A depicts a perspective view of a first hold-down in accordance with the present invention.
Figure 1B:
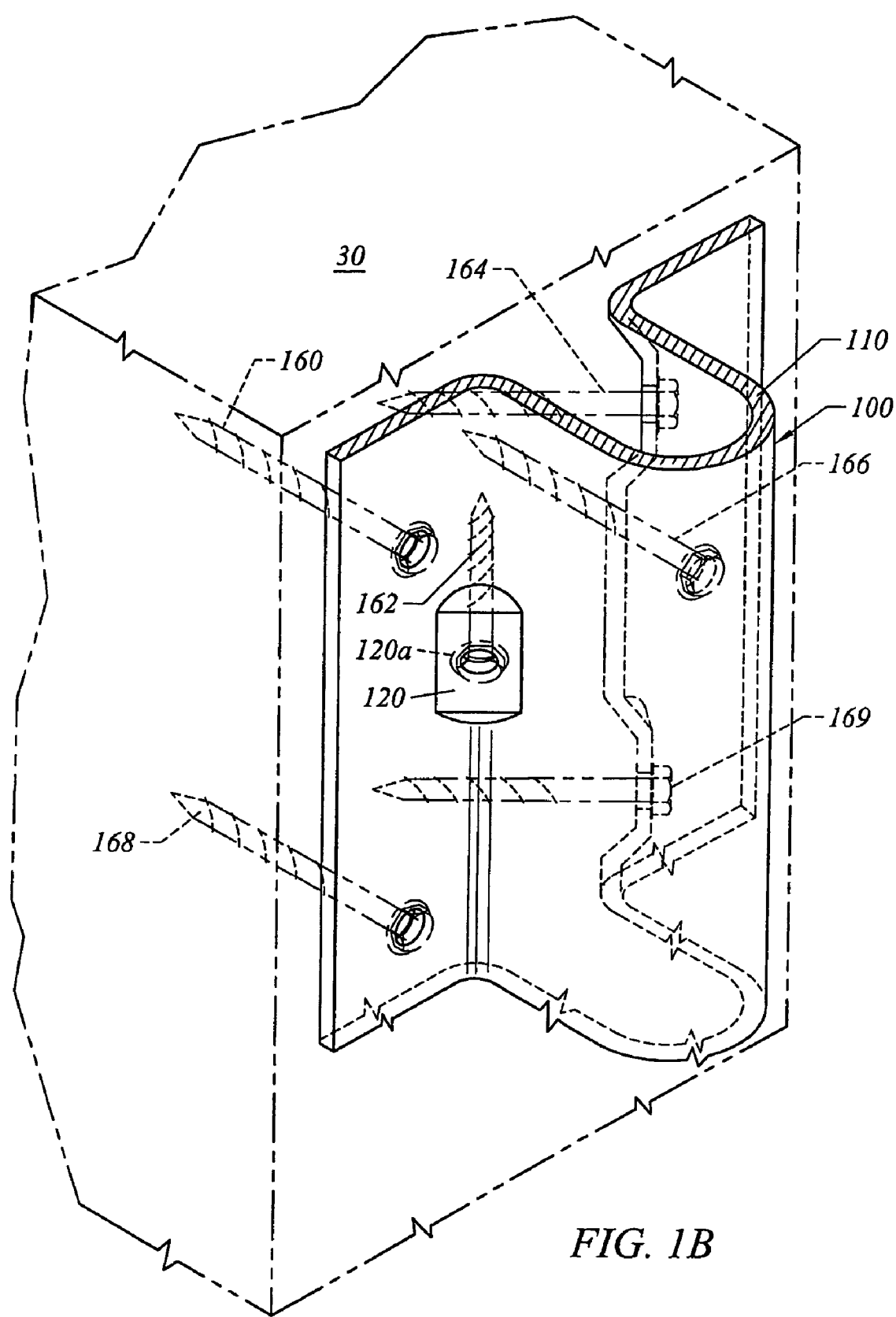
FIG. 1B is a partial, enlarged perspective view of the hold-down of FIG. 1A.

FIG. 1A is a perspective view and FIG. 1B an enlarged, partial perspective view of a hold-down 100 created in accordance with the present invention. As shown in FIG. 1A, hold-down 100 secures one end of an anchor bolt 20, which has a second end secured in the foundation 45 of a building. In FIG. 1A, the foundation includes a concrete section 40 and mud sill 25. The particular construction and placement of the anchor bolt 20 in the foundation installation 45 is not critical to the hold-down apparatus of the invention.

As shown in FIGS. 1A and 1B, the hold-down 100 is secured to a building column 30 by a plurality of dowel fasteners 160, 162, 164, 166. As used herein, the dowel fasteners can be any pin, or block, of wood or metal, fitting into holes in the abutting portions of the column and the hold-down 100 pieces, and being partly in one piece and partly in the other, to keep them in their proper relative position. In the embodiment shown in FIGS. 1A and 1B, the dowel fasteners may comprise anchor screws specifically adapted to secure a body in wood. An exemplary wood screw which is acceptable for use in accordance with the present invention is a Simpson Strong-Drive® wood screw model SDS ¼×3, disclosed in U.S. Pat. No. 6,109,850. It should be recognized that any type of wood screws, nails, or other types of dowel fasteners, including wood dowels, are acceptable for use in fastening the hold-down 100 to column 30.

Hold-down 100 includes a body 110 comprising a semi-cylindrical portion (best viewed with respect to FIG. 2A) which surrounds the anchor bolt 20. After hold-down body 110 is secured to the column using the dowel-fasteners, a washer 39 is positioned over the first end 102 of the hold-down 100 and a nut 37 is rotated onto threads 35 of anchor bolt 20 to secure column 30 to the foundation. Body 110 of hold-down 100 includes a first flange 112 and a second flange 114 designed to abut the column 30 and secure the hold-down thereto through the use of a plurality of dowel fasteners. All of the respective bores herein may have smooth or threaded edges adapted to the type of dowel fastener used.

In accordance with the present invention, hold-down 100 is constructed to be easy to install, yet provide an improved shearing resistance relative to the column by the use of a unique stitching pattern of dowel fasteners. This pattern is illustrated in FIGS. 2A through 2C and FIG. 1B. As shown in FIGS. 2A through 2C, the hold-down 100 includes a plurality of angled dowel fastener structures 120-134, each allowing the positioning of a dowel fastener (such as fasteners 162 and 164, illustrated in phantom in FIG. 2A) at an angle relative to the surface 50 of column 30. Also included are a plurality of vertical dowel bores 140 through 154, which allow dowel fasteners having a perpendicular orientation relative to the surface 50 of column 30 (such as fasteners 160 and 166 shown in phantom FIG. 2A) to secure the hold-down 100 to column 30. This combination of angled dowel mounting structures and perpendicular dowel through bores creates a stitching pattern which provides a higher degree of shear resistance between the hold-down 100 and the column than in previous embodiments using dowel-type fixtures. Alternative constructions of the angled dowel fasteners, such as those shown in U.S. Pat. Nos. 4,291,996 and 5,603,580, may be utilized in accordance with the present invention. Such patents are hereby fully incorporated by reference.

As shown in FIGS. 1B, 2A and 2C, a stitching pattern is created by the dowel fasteners when inserted into column 30, through the placement of the mounting structures and bores in the hold-down 100. FIGS. 1B and 2C illustrate certain unique aspects of the stitching pattern. In FIG. 1B, only five dowel structures 160, 162, 164 and 166 are illustrated for clarity in this enlarged, partial perspective view. As shown in FIG. 2C, an exemplary angled mounting structure 120, including an angled bore 120A, is positioned along the y-axis slightly above a laterally aligned vertical bore 154 on an opposite flange. Respective pairs of angled mounting structures and perpendicular mounting bores extend along the z-axis length L of the hold-down 100.

Structure 120 is positioned between on first side flange 114 and the semi-cylindrical bold housing 110, while bore 154 is provided on the second side flange 112. Just below vertical bore 154 on second flange 112 is another angled mounting structure 134 and associated angled bore 134a, which is generally laterally aligned with a vertical mounting bore 140 on first side flange 114. As such, the angled dowel-fasteners are positioned into the column toward a perpendicularly mounted dowel-fastener at the approximate same lateral location on the z-axis of the hold-down. In one embodiment, the angled mounting structures provide each dowel fastener at the same angle alpha ($\alpha$) of about 45 degrees. In alternative embodiments, this angle may vary in a range of about 20-80 degrees. In still further embodiments, the mounting bodies may provide respective ones of dowel fasteners passed there-through at differing angles on the same hold-down. This inter-digited pattern of alternating angled mounting structures and vertically aligned bores repeats along the length of the hold-down.

In FIGS. 2B and 2C, 15 such pairs of angled and perpendicular mounting bores are provided in the hold-down 100. Also shown are diamond-shaped mounting holes 191 through 194 which may be used to initially secure the position the hold-down with pin nails or other dowel fasteners while the main dowel fasteners are inserted into the hold-down 100. In the embodiment shown in FIG. 2A, bore 154 is offset from a horizontal line parallel to the y axis intersecting the center of bore 120a in vertical mounting structure 120 by a small distance in the Z-axis direction. It should be recognized that in alternative embodiments of the invention, the spacing away from the Y-axis may be greater than the size of the bores, or no offset may be provided.

When all dowels are inserted into mounting bores 120A through 134A and 140 through 154, a stitching pattern of dowel fasteners such as that illustrated in FIGS. 2A and 2C results in the column 30. The stitching pattern provides much greater securing force in wood than heretofore known with conventional hold-downs. In addition, the hold-down 100 is much easier to install than previous hold-down embodiments as an installer need only drive hold-downs into the wood once the hold-down is positioned, and attach the washer 39 and nut 37. The dowel mounting structures intersect along an axis P extending through the column 30.

As will be understood by one of average skill in the art, support 30 will generally be manufactured out of natural or engineered wood, and as such will have a plurality of grains running along the z-axis as shown in FIGS. 1A-2C. In the grains will be generally adjacent to each other in the x-y plane. With reference to FIGS. 1B and 2A, because the dowel fasteners enter the support 30 at three separate angles (for example, 90 degrees, 45 degrees and 135 degrees) at least two of the fasteners will intersect the grains in the wood. Intersecting the grains of the wood in the support substantially reduces any chance for splitting the wood, and increases the retention of the hold-down with respect to the support.

Exemplary dimensions of the embodiment shown in FIGS. 1A-2C include a length of about 19¾±⅟₁₆ inches, Vertical spacing between perpendicular mounting bores (such as, for example, bores 153 and 154 is about 2½±⅙ inches. This spacing may be increased or decreased without substantially departing from the present invention. In alternative embodiments, the spacing may be as small as 2 inches. In additional embodiments, the spacing may be less than two inches. The hold-down of the present invention thereby provides a density of angled and perpendicular dowel fasteners in a line running generally parallel with the grain of the wood at about one per two inches, without splitting the wood.

Hence, the present invention provides a fastener density of approximately one bore per two square inches. In alternate embodiments, this density is one bore per 1.9 square inches. In a further unique aspect, because the angled dowel fasteners enter the support at an angle, these fasteners cross several grains of the wood comprising the column. This feature in combination with the vertically installed dowels ensures a strong retentive force for the hold-down relative to the column.

A further advantage of the embodiment shown in FIG. 2A through 2C is the use of spacing tabs 106 to 108 which position the hold-down at a standard height so that the first dowel fastener inserted into vertical mounting bore, such as bore 147, is at least 2½ inches from the surface of the underlying sill or stud. This distance may be the same as, or different from, the inter-bore spacing.

Alternative embodiments of the present invention are shown in FIGS. 3A through 3C and 4A through 4C. In the embodiment shown in FIGS. 3A through 3C, the hold-down 300 includes a plurality of vertically aligned dowel mounting holes 340 through 357 and angled mounting structures 320 through 337. Once again, respective pairs of the angled mounting structures, such as structure 337 and vertical mounting bores such as bore 340 are laterally aligned along the Y axis shown in FIG. 3B. Eighteen pairs of mounting structures are provided. In the embodiment in FIG. 2B, an asymmetric number of angled mounting structures are provided on respective flanges 114 and 112. In FIG. 2B, eight angled mounting structures are provided on flange 114 and seven on flange 112. In FIG. 3B, a symmetric number of flanges is provided, mounted on each flange 312, 314.

The embodiment of FIGS. 3A-3C has a length of about 23³⁄₁₆±⅟₁₆ inches, a width of 3¼±⅟₁₆ inches. Vertical spacing between perpendicular mounting bores (such as, for example, bores 336a and 337a) is about 2³⁄₁₆±⅟₁₆ inches. Note that the spacing may be increased or decreased without substantially departing from the present invention. In alternative embodiments, the spacing may be as small as 2 inches.

Figure 4A:
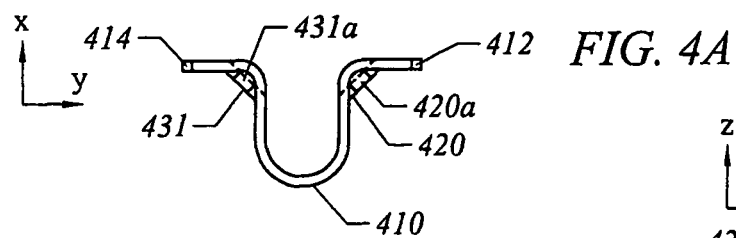
FIG. 4A is an end view of the third embodiment of a hold-down in accordance with the present invention.
Figure 4B:
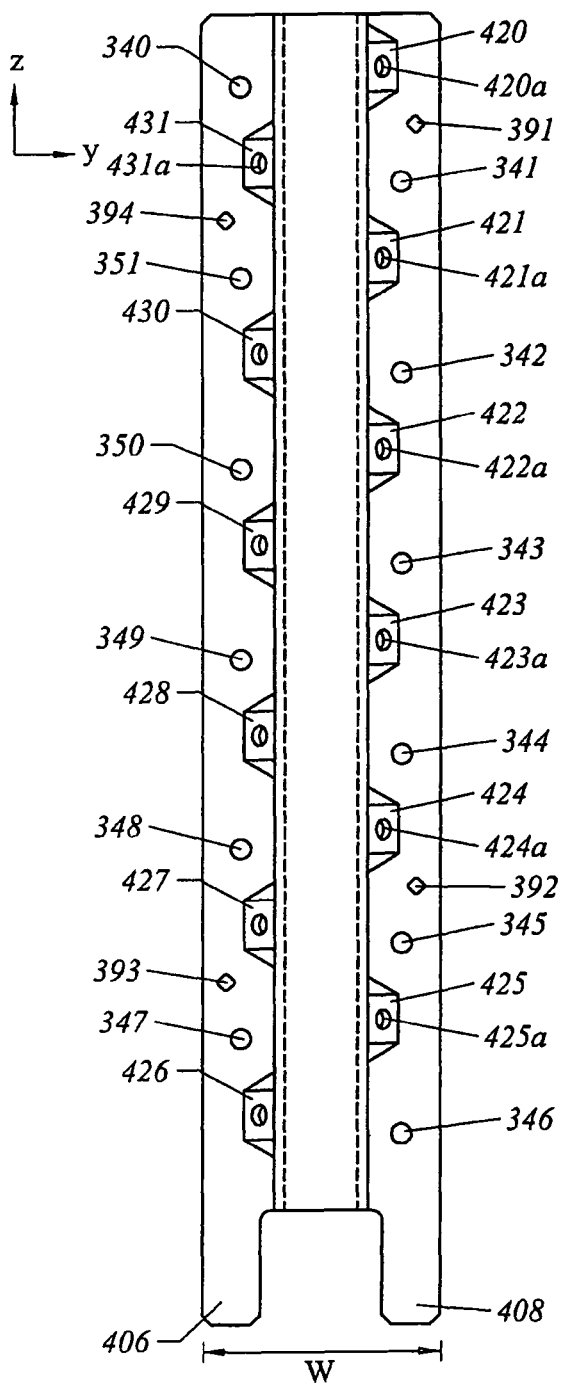
FIG. 4B is an elevation view of the third embodiment of a hold-down in accordance with the present invention.
Figure 4C:
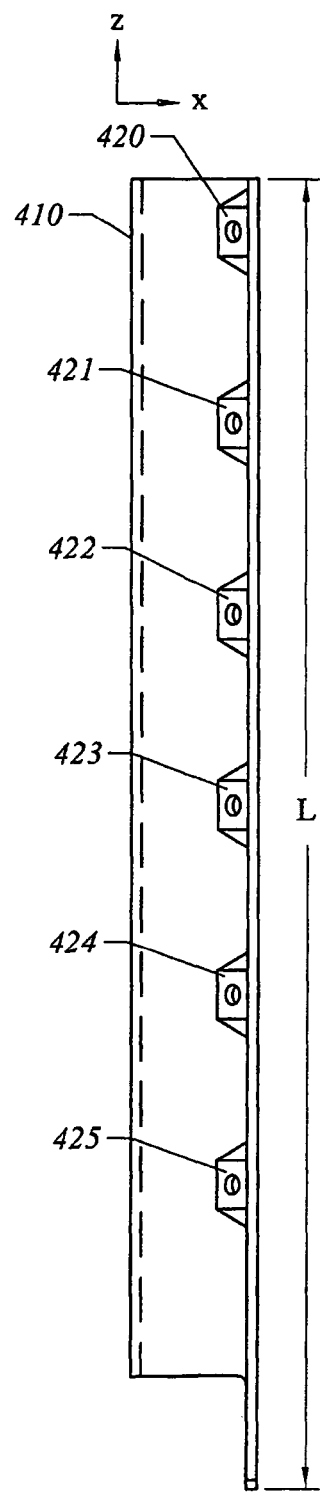
FIG. 4C is a side view of the third embodiment of a hold-down in accordance with the present invention.

Another symmetric embodiment showing a smaller number of angled mounting structure is shown FIGS. 4A through 4C. As shown therein, 12 laterally aligned pairs of vertical mounting bores, such as bore 440 and angled mounting structures such as structure 420, are provided. This embodiment has a length of about 17⅞±⅟₁₆ inches, a width of 3⅟₁₆±⅟₁₆ inches. Vertical spacing between perpendicular mounting bores (such as, for example, bores 336a and 337a) is about 2½±⅟₁₆ inches. Again, the spacing may be increased or decreased without substantially departing from the present invention. In alternative embodiments, the spacing may be as small as 2 inches, and may be increased to any reasonable amount.

FIGS. 5A and 5B and FIGS. 6A through 6E show another alternative embodiment of the present invention. In the embodiment shown in these figures, side flanges serve as support for angled dowel fasteners, while perpendicularly oriented fasteners are provided through the interior cavity of the hold-down 500.

Figure 5A:
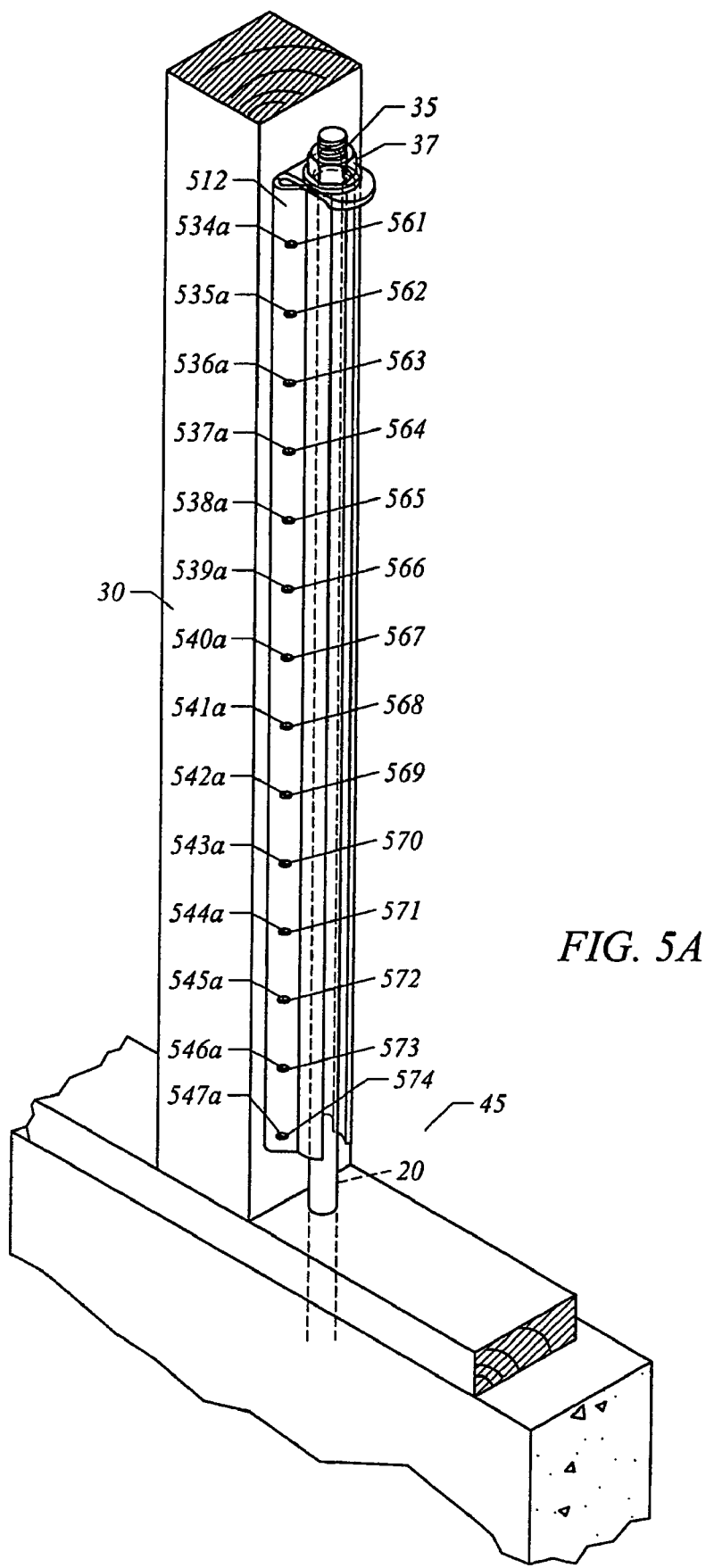
FIG. 5A is a perspective view of a fourth embodiment of a hold-down in accordance with the present invention.
Figure 5B:
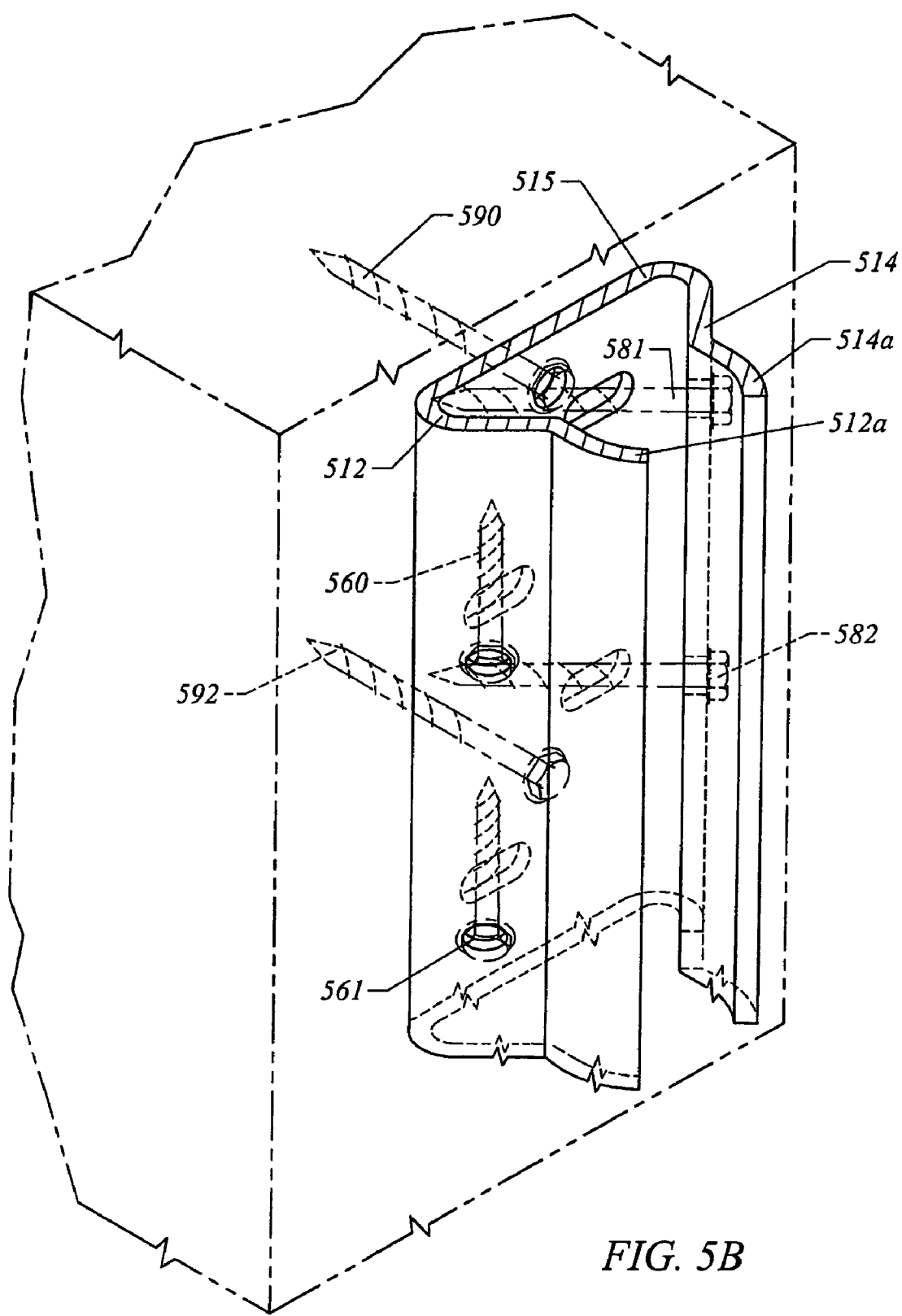
FIG. 5B is an enlarged perspective view of the hold-down in FIG. 5A.

FIG. 5A shows a perspective view of hold-down 500, while FIG. 5B shows a partial, enlarged perspective view of hold-down 500. As shown in FIGS. 5A and 5B, hold-down 500 configured into a generally triangular shaped main body 515. Main body 515 includes a first side 512, a second side 514, and a base side 516. The anchor bolt 20 is provided in the interior cavity 505 of hold-down 500, and extends through a central bore 504 in top plate 502. First side 512 includes an arcuate section 512a and second side 514 includes an arcuate section 514a, both being configured with an arc length and curvature configured to surround and engage anchor bolt 20. As shown therein, hold-down 500 is secured to support 30 by a plurality of dowel fasteners, of which the top of fasteners 561-574 are illustrated in circular bores 534a-547a on side 512 of hold-down 500 in FIG. 5A. FIG. 5B illustrates the fasteners 560, 561, 580, 581 and 590a embedded in support 30. Like the previous embodiments, an inter-digited perpendicular and angular stitching pattern of fasteners is provided.

A plurality of perpendicular dowel mounting bores 590 through 597 is provided down the centerline of base side 516 of hold-down 500. Bores 590-597 allow dowel fasteners to be oriented perpendicular to the surface of support 30 to secure hold-down 500 thereto. (Only fasteners 590a and 592a are illustrated in FIG. 5B). A plurality of circular bores 520B through 533B are provided on the first side 514 of hold-down 500. A plurality of associated slots 520a through 533a, each said slot associated with a respective circular bore 520b-533b, are provided in the base panel 515 of hold-down 500. A dowel fastener passing through a respective one of the circular bores, such as bore 520b, is angled to pass through an associated slot, such as slot 520a and enter the underlying column to which the hold-down 500 is secured. Second side 512 includes an additional number of circular bores 534b through 546b and slots 534a through 546a to allow a second set of dowel fasteners to be included on second side 512. Notably, the slots on each respective side are interdigited with respect to each other, and alternate down the length of hold-down 500. It should be understood that a slotted-shape for openings 521a-547a is used in order to provide the installer some leeway in positioning a tool through the opening to secure the fastener in bores 521-547. This means that all angled dowel fasteners need not enter the support 30 at exactly the same angle. In an alternative embodiment, bores having a diameter sized to ensure the dowel fastener to enter the support at a fixed angle may be provided. Vertically aligned dowels are provided in the vertical mounting bores 590 through 597. A portion of this crossing pattern of alternating sets of fasteners is illustrated in FIG. 5B.

Figure 7:
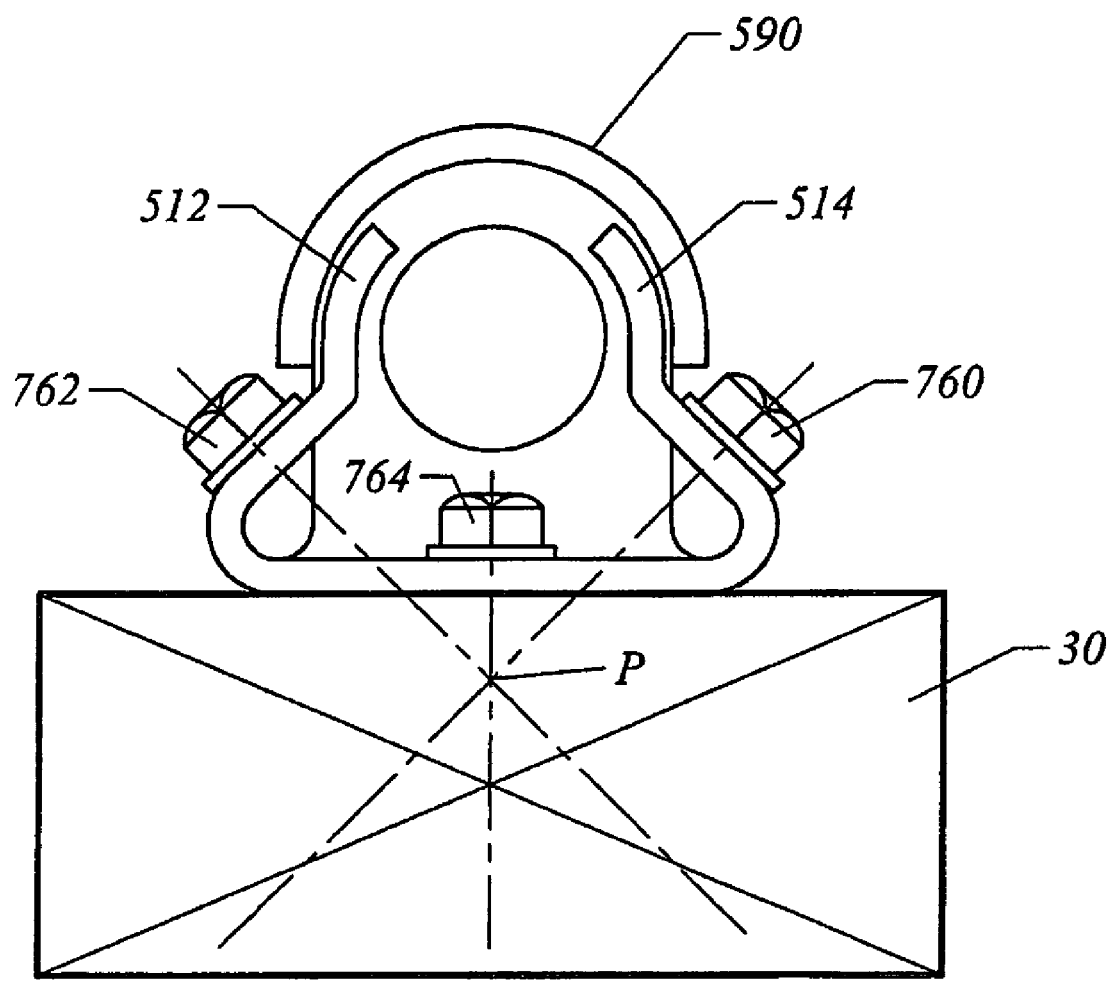
FIG. 7 is an end view of the fourth embodiment illustrating positioning of the dowel fasteners in cross-section in a column.

The stitching pattern created by the embodiment shown in FIGS. 5A through 6E is illustrated in further detail in FIG. 7. In FIG. 7, only the tops of the dowel fasteners 760, 762 and 764 are shown, with the axes of the fasteners as they pass through the support 30 shown in hairline to illustrate how the pattern of fasteners ensures the crossing of several wood grains in the support 30. As shown therein, the cross lines of the dowel mounting structure intersect along an axis P extending through the column 30. Axis P is present in many of the coupling member embodiments described herein. In some such embodiments, all dowel fasteners are positioned so that their intersections in the wood member, viewed from the end of the elongated wood member, form a single axis P (as a single line) extending through the length of the column. In these embodiments, the angled mounting bores are configured to provide the fasteners at the same respective left side and right side angles, and are equidistant from the centerline of the hold-down, in the member. In alternative embodiments, the angled mounting bores on either side may be provided at different angles, or the bores positioned at different distances from a centerline of the hold-down, so that the intersection points of any two fasteners entering the column from opposing sides of the hold-down may be at a different location in the member, viewed along the length of the column. In such cases, the intersection point, viewed from the perspective shown in FIG. 7, of any two opposing left side and right side fasteners, will vary in the x-y plane, and hence the axis P connecting any two intersection points will vary as well.

Because the angled fasteners enter the wood at two or three different angles with respect to the grain, the potential for splitting the wood is reduced and the retaining force of the hold-down with respect to the support is increased.

Hold-downs in accordance with the present invention may be manufactured out of 10 gauge g90 galvanized steel. Alternative grades of coated galvanized steel, as well as other corrosion resistant steels and other materials may likewise be used.

FIGS. 8A-8F show another alternative embodiment of the present invention. Hold-down 800 includes a holding body 802, dowel fasteners provided in mounting bores 820-854 and 860-894, cap plate 837 and nut 835 securing plate 837 and hold-down body 802 to an anchor bolt 20 extending from the foundation element (or mudsill). The anchor bolt 20 extends into the foundation as in previous embodiments. In hold-down 800, the portion of anchor bolt 20 extending from the foundation rests in a central recess 819 of hold-down body 802 forming the apex of a generally "W"-shaped cavity (shown in cross-section in FIG. 8B) defined by walls 812, 814, 816, 818 and recess 819. Recess 819 has an arcuate shape with a curvature sized to abut contiguously with a portion of anchor bolt 20.

Figure 8A:
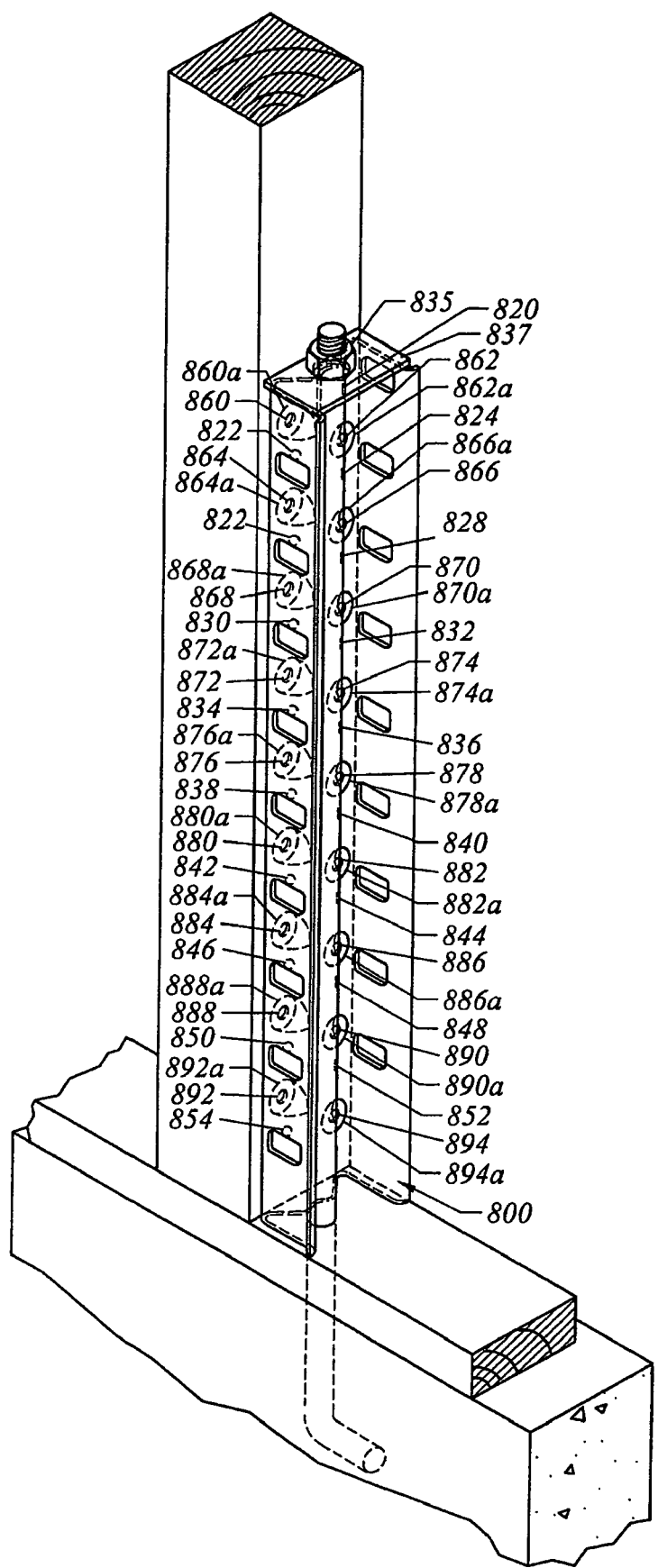
FIG. 8A is a perspective view of a fifth embodiment of a hold-down in accordance with the present invention

Angled fastener mounting bores 820 through 837 are provided in each of walls 816 and 818. Bores 820 through 828 are provided in wall 816, while bores 829 through 837 are provided in wall 818. Adjacent to each respective angled bore 820 through 837, is an associated vertical fastener bore 840-857. For example, vertical fastener bore 840 as provided adjacent angle fastener bore 829, vertical fastener bore 841 is provided adjacent angled fastener bore 820, and so forth as shown in FIG. 8C. Vertically aligned bores such as bore 840 are provided by stamping a portion (for example, 840a) of each angled wall (for example 816) into a position where it abuts the face of column 30. In the embodiment shown in FIGS. 8A-8F, the stamped regions 860a-894a are shown as being circular. It should be recognized that the stamped regions may take alternative shapes, such as square or rectangles.

Alternating ones of stamped portions 840a through 857a are provided to house bores 840 through 857. Alternating pairs of angled faster bores and vertical fastener bores are provided in hold-down 800 as shown in FIG. 8B. For example, bore 840 is vertically aligned as position adjacent angle bore 829, vertically aligned bore 841 is provided adjacent angle bore 820, and vertically aligned bore 842 is provided adjacent angled bore 840. Vertically aligned bore 840 houses a dowel fastener 866 adjacent to an angled dowel fastener 860 provided in angle bore 829. Likewise, angle bore 820 houses a dowel fastener 862 adjacent to a vertically aligned dowel fastener 864 provided in vertically aligned bore 841. This results in the alternating pattern of angled and vertically aligned pairs of fasteners and stitching pattern created by, for example, fasteners 861, 834, 865, 867, shown in FIG. 8D which continues along the length of hold-down 800 in a manner similar to that previously set forth with respect to other embodiments. Each respective pair of fasteners has an angled fastener entering column 30 in an opposing relationship to angled fasteners adjacent to it along the length of body 802. This is best illustrated in the cross-sections of FIGS. 8E and 8F.

As illustrated in FIG. 8C, slots 814a through 814i are provided in respective wall 814 and 812. Each slot 814a-814i is aligned with one of angled bores 820, 824, 828, 832, 836, 840, 844, 848, and 852. Corresponding slots are provided on sidewall 812 for angled bores 822, 826, 830, 834, 838, 842, 846, 850, and 854. This allows the installer to easily insert angled fasteners through slots 814a-814i on wall 814 into bores 820, 824, 828, 832, 836, 840, 844, 848, and 852 to secure the hold-down 800 and place against column 30. The hold-down 800 is manufactured out of g90 galvanized steel and is formed into the cross-sectional shape shown in FIG. 8B by bending or pressing the flat steel plate into the shape shown in FIG. 8D. Regions 860a-894a are then stamped into the formed body to provide the vertically aligned fastener bores.

It should be recognized that any number of suitable alternative means exist for creating the alternating pattern of angled and vertically aligned fasteners entering the column in alternative embodiments of the hold-down of the present invention. In still further embodiments, adjacent angled fasteners need not alternatively oppose each other, but rather a sequence of two or more angled fasteners entering in parallel may be provided before one or more opposing angled fasteners is provided along the length of the hold-down.

FIGS. 9A through 9D show yet another alternative embodiment of a hold-down 900 in accordance with the present invention. Like hold-down 800, hold-down 900 is formed out a single sheet of steel which may be bent or otherwise folded to create a cross-sectional shape shown in FIG. 9B. The process for creating the hold-down 900 is illustrated in FIGS. 10A through 10E.

Figure 9A:
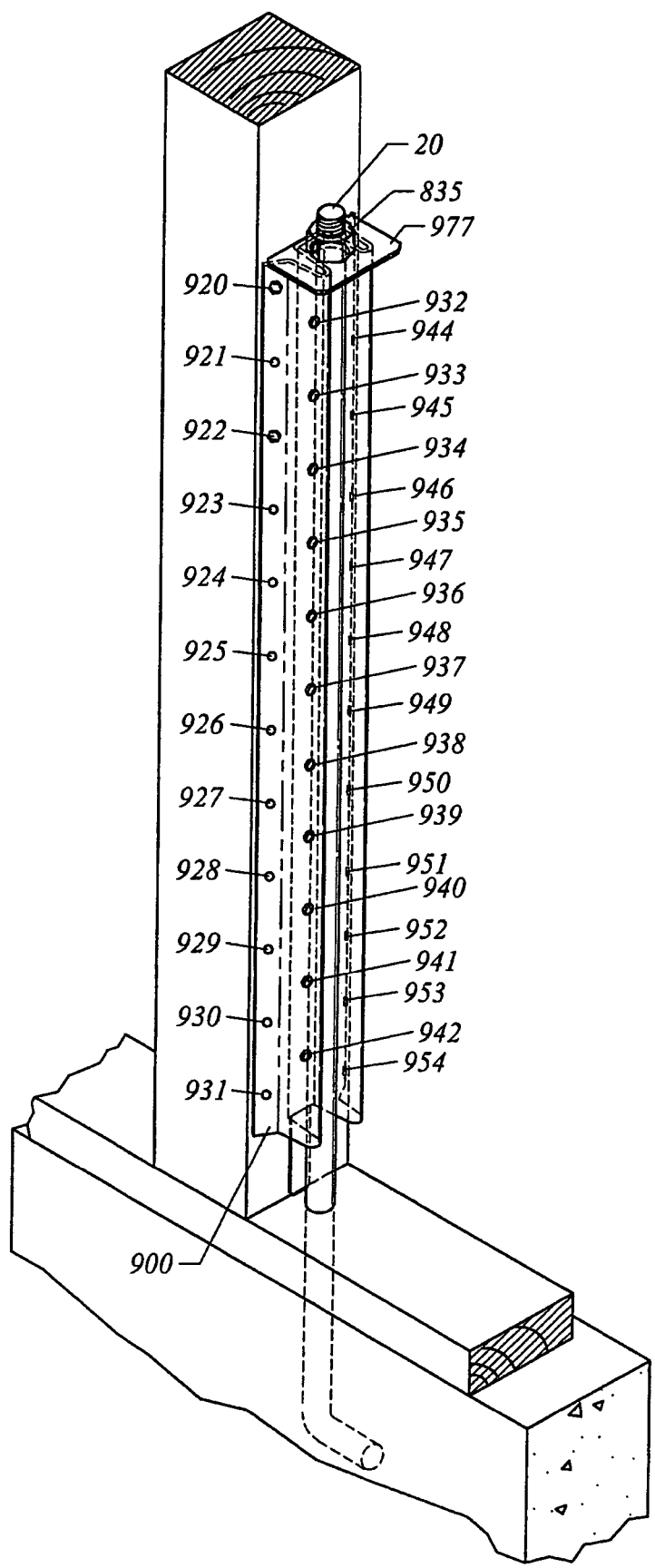
FIG. 9A is a perspective view of a sixth embodiment of a hold-down in accordance with the present invention
Figure 9B:
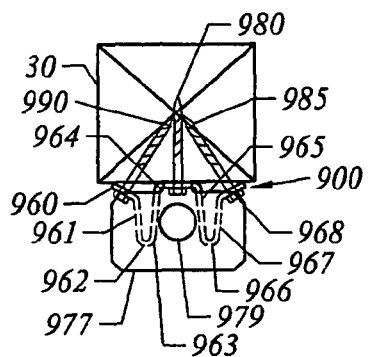
FIG. 9B is an end view of the sixth embodiment of a hold-down in accordance with the present invention.
Figure 9C:
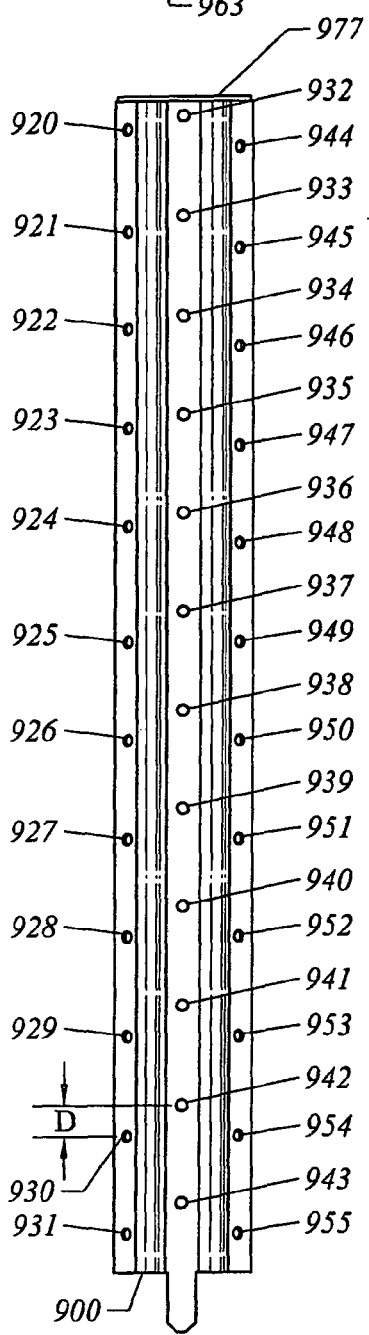
FIG. 9C is an elevation view of the sixth embodiment of a hold-down in accordance with the present invention.
Figure 9D:
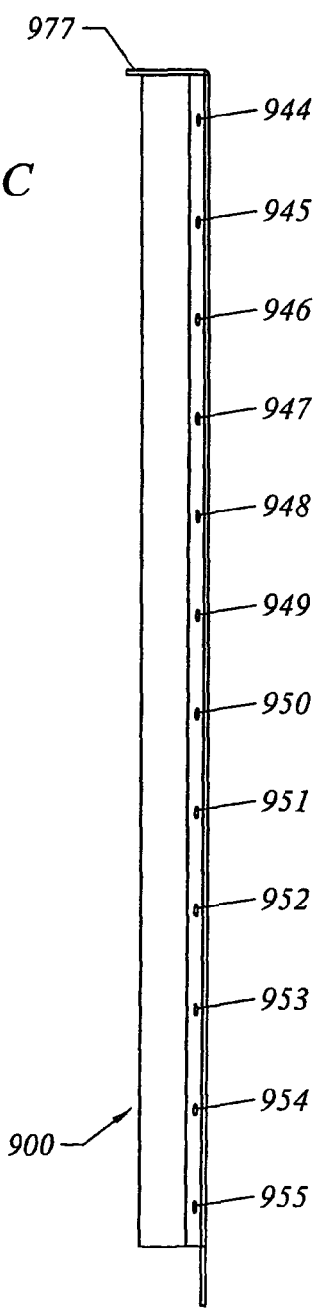
FIG. 9D is a side view of the sixth embodiment of a hold-down in accordance with the present invention.

FIGS. 9A through 9D show a perspective, top, elevation and side view, respectively, the hold-down 900 formed in accordance with this embodiment. As shown in FIG. 9C, a plurality of angled fastener bores 920 through 931 and 944 through 955 are provided. Hold-down 900 includes a first side flange 968 and second side flange 960, first side wall 967 and second side wall 961, a first arcuate portion 966 and second arcuate portion 962, a third side wall 965 and fourth side wall 963, and a planar portion 964. Angled bores 920 through 931 are provided in flange 968, while angled bores 944 through 955 are provided in flange 960. Vertically aligned bores 932 through 943 are provided in planar portion 964. A cover plate 977 with a through bore 979 for receiving anchor bolt 20 is connected to planar section 964. A spacer 906 insures that the bottom portion of hold-down 900 is spaced apart approximately 1.5 inches from the foundation 45. As shown in FIG. 9C, vertically aligned bores 932 through 943 are spaced a distance "C" of approximately 0.375 inches above the laterally aligned angled bores. For example, for 930 there is spaced a distance D approximately 0.375 inches from a line intersecting bores 930 and 944. The stitching pattern which results from this arrangement of mounting boards as shown in FIG. 9B. Fasteners 980, 985, and 990 are respectively provided in bores 920, 932 and 994. This pattern repeats along the length of the hold-down 900 shown in FIG. 9.

The hold-down shown in FIGS. 9A-9E has an advantage of being formed from a single piece of steel, which includes the bolt cap 977. Side walls 965 and 963 form a channel in which an anchor bolt (not shown in this embodiment) rests, with the end of the anchor bolt extending through bore 979 in bolt cap 977.

The hold-down of FIGS. 9A-9E is illustrated in a configuration wherein respective left and right side fasteners 990 and 985 do not have an intersection when viewed along the length of the column 30, as shown in FIG. 9B. Instead, the fasteners converge on a point P', but do not intersect. However, it should be understood that the angle of respective sides 960 and 968 may be altered to provide such an intersection.

FIGS. 10A through 10E show the assembly process for creating a hold-down 900. As shown in FIG. 10A, a hold-down blank is formed into a planar shape which includes the mounting holes, cap 977 and spacer 906. The hold-down may be formed by stamping or machining a steel sheet having a thickness of 0.135 inch into the form shown in FIG. 10A. Bores 920 through 955 may be formed into the planer member 900 prior to the assembly bending process, described below.

Once the blank formed, at a first step, edges 960 and 968 are formed by bending the edges of the stamped panel 900 along a first crease line 902A and 902B to create flanges 968 and 960. Next, as shown in FIG. 10C, the blank is bent again along crease lines 904a and 904b to create the first and second side walls 967 and 961. It should be noted that the angle of flanges 968 and 960 is maintained. Next time, a third bend is made along crease lines as 908a and 908b to create the 3rd and 4the side walls 965 and 963, respectively. Finally arcuate sections 962 and 966 are formed by bending the blank further crease lines 904A and 904B to return the edges of flanges 960 and 968 to be parallel to planer member 964. Finally, cap member 977 is bent into position and the hold-down 900 is ready for assembly into a building structure. The assembled hold-down 900 has a width of approximately 3.375 inches with a length of approximately 31.125 inches. Spacing between both angled bores and vertical bores can be on the order of 1.75 inches. It should be recognized that these dimensions may be varied without departing from the scope of the present invention.

FIGS. 11A through 11E show yet another alternative of the hold-down of the present invention. FIGS. 11A-11E illustrate various embodiments of the assembled hold-down, while FIG. 11F illustrates a stamped hold-down blank prior to assembly. Hold-down 1100 is formed out of out a single sheet of steel which may be stamped into the general shape shown in FIG. 11F, and folded to create cross-sectional shapes shown in FIGS. 11A-11E.

As shown in FIG. 11A, a plurality of angled fastener bores 1120a-1153a are provided, each associated with a respective slot in base panel 102 of hold-down 1100. Hold-down 1100 includes a first side wall 1160 housing angled fastener bores 1120a-1136a and second side wall 1162 housing angled fastener bores 1137a-1153a. Slots 1120-1153 positioned in base wall 1102 are respectively aligned with angled fastener bores 1120a-1153a. Walls 1160 and 1162 form a channel 1103 which surrounds an anchor bolt (not shown) in a manner similar to walls 963, 965 in the embodiment of FIGS. 9 and 10. A cover plate 1177 with a through bore 1179 for receiving anchor bolt 20 is connected to planar section 1102. A spacer 1106 insures that the bottom portion of hold-down 1100 is spaced apart approximately 1.5 inches from the foundation 45. As shown in FIG. 11C, the spacing between the centerlines of adjacent angled bores (and hence associated slots) is a distance "s" of about 2.25 inches. It should be understood that in one embodiment, the distance S may be constant, while in alternative embodiments, the distance S may be varied to provide a staggered pattern to the fasteners.

Unlike previous embodiments, no vertically aligned fastener bores are provided. It should, however, be recognized that the embodiment of FIGS. 11A-11E can be modified to include vertically aligned fastener bores in base 1102. Each angled fastener bore and slot pair (for example bore 1120a and slot 1120, and slot 1121 and bore 1121a) on first wall 1160 is in an interdigited relationship with pairs on wall 1162. For example, bores 1137/1137a are positioned between bore slot pairs 1120a/1120 and 1121/1121a. This interdigited pattern repeats along the length of the hold-down 900 shown in FIG. 9. Smaller, temporary nail holes 1157 are provided to allow a contractor to use nails to temporarily secure the hold-down in position with while the fasteners are inserted into respective pairs of angled bores and slots.

To attach the hold-down 1100 to a foundation, the hold-down 100I positioned adjacent the support 30 to which it is to be attached, the base 1106 resting on the foundation. The hold-down may be secured by vertical jails in bores 1157, after which angled fasteners are provide through respective angled fastener bores and associated slots. The stitching pattern which results from this arrangement of angled mounting bores and slots as shown in FIG. 11E. Fasteners 1180 and 1182 are respectively provided in bores 1122a and 1138a. The hold-down may then be secured by a nut and washer on the anchor bolt (not shown) resting in channel 1103.

Two alternative side wall patterns are illustrated in FIGS. 11B/11E and 11D. A first alternative of the sidewall pattern is illustrated in FIG. 11B. In FIG. 11B, sidewall 1168 includes a ridge 1104, and sidewall 1162 a ridge 1110 running the length of each sidewall. Ridges 1108 and 1110 provide additional rigidity along the length (L) of the hold-down 110. FIG. 11D, illustrates an alternative hold-down 1100-1 in which each wall 1162, 1168 has ends flared outwardly, away from channel 1102 of the hold-down.

The hold-down shown in FIGS. 11A-11F has an advantage of being folded into form from a single piece of steel, which includes the bolt cap 1177. In a manner similar to the hold-down 900, hold-down 1100 is formed as a hold-down blank by stamping a steel sheet having a thickness of 0.135 inch having a generally planar form. Angled mounting bores 1120a-1153a and slots are formed by stamping the semi-circular shape outwardly from each side wall 1162, 1168. Angled mounting bores are stamped outwardly as a separate, or in conjunction with the stamping process forming the blank. Flare 1112, 1114 or ridge 1108, 1110 are then formed, and into a planar shape which includes the mounting holes, cap 1177 and spacer 1106.

Next, the blank is bent again along crease lines 1162a and 1162b to create the first and second side walls 1160 and 1162. Finally, cap member 1177 is formed by first folding edge 1178 along crease line 1173 to form ridge 1175, and then bending cap 1177 into position along crease line 1179. The assembled hold-down 1100 has a width of approximately 3.375 inches with a length of approximately 31.125 inches. It should be recognized that these dimensions may be varied without departing from the scope of the present invention.

FIGS. 12A-12D illustrated another embodiment of the hold-down 1200. Hold-down 1200 includes similar features to hold-down 1100, but illustrates three variations therefrom. Sidewalls 1262 and 1268 are formed without a flare or ridge line. In addition, a fewer number of angled bore/slot pairs (thirteen) are provided. Seventeen are provided in hold-down 1100. Finally, the hold-down 1200 is asymmetrical, having 13 angled bore/slot pairs on one side (wall 1262) and 12 on another (wall 1268).

The coupling system of the present invention provides a strong shearing force utilizing a plurality of small dowel fasteners in a unique stitching pattern which does not split the wood. While the invention has been described in exemplary form as a hold-down, it will be recognized that the coupling system has applicability to other structural reinforcement techniques. The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A hold-down system coupling a building support to a foundation using an anchor bolt, the building support having a surface, comprising:
    a body having a first end and a second end, a semi-cylindrical portion positioned in the middle of the body and extending from the first end to the second end and adapted to contain the anchor bolt, a first flange continuous with and adjacent to one side of the semi-cylindrical portion and defining a first transition portion between the semi-cylindrical portion and the first flange, and a second flange continuous with and adjacent to another side of the semi-cylindrical portion and defining a second transition portion between the semi-cylindrical portion and the second flange;
    a first plurality of angled fastener bores positioned on the body in the first transition portion between the semi-cylindrical portion and the first flange;
    a second plurality of angled fastener bores positioned on the body in the second transition portion between the semi-cylindrical portion and the second flange; and
    a plurality of perpendicular fastener bores positioned on the first and second flanges, each of said plurality of perpendicular fastener bores being associated with a corresponding angled fastener bore from at least one of said first or second plurality of angled fastener bores, wherein each angled fastener bore is offset from its associated perpendicular fastener bore, each set of associated perpendicular and angled fastener bores being spaced apart along said body between said first end and said second end.

2. The hold-down system of claim 1 wherein a density of angled and perpendicular fasteners entering a building support when said fasteners are positioned in said fastener bores is about one fastener per two square inches.

3. The hold-down system of claim 1 wherein the plurality of perpendicular fastener bores includes a first plurality of bores on said first flange associated with said second plurality of angled fastener bores, and a second plurality of perpendicular fastener bores on said second flange associated with said first plurality of angled fastener bores.

4. The hold-down system of claim 1 wherein the plurality of perpendicular fastener bores is positioned along a line between said first end and said second end, each at an equal distance from said first and second flanges.

5. The hold-down system of claim 4 wherein one of said plurality of perpendicular fastener mounting bores is associated with at least two of said angled fastener bores.

6. The hold-down system of claim 1 wherein each angled fastener bore positions a fastener at an angle with respect to the support.

7. The hold-down system of claim 1 wherein each said angle is approximately forty-five degrees.

8. The hold-down system of claim 1 wherein adjacent angled bore fasteners along the length of the hold-down position respective fasteners at equal but opposing angles.

9. A hold-down securing a building support to a foundation, comprising:
    a body having a length, a width, a top, a bottom, a securing section extending along the length of the body and enclosing-a first portion of an anchor bolt, the anchor bolt having a second portion provided in the foundation, a first flange formed on one side of the securing section and a second flange formed on another side of the securing section;
    a first plurality of angled fastener positioning bores on the body between the first flange and the securing section;
    a second plurality of angled fastener positioning bores on the body between the second flange and the securing section;
    a first plurality of generally perpendicular fastener bores on said first flange, each of said first plurality of generally perpendicular fastener bores being interposed with respective ones of said first plurality of angled fastener positioning bores;
    a second plurality of generally perpendicular fastener bores on said second flange, each of said second plurality of generally perpendicular fastener bores being interposed with respective ones of said second plurality of angled fastener positioning bores;
    wherein each of the first and second angled fasteners are spaced apart on alternating sides of the securing body along the length of the body.

10. The hold-down of claim 9 wherein each of said first plurality of angled fastener bores is positioned opposite a laterally associated one of said second plurality of generally perpendicular fastener bores, and each of said second plurality of angled fastener bores is positioned opposite a laterally associated one of said first plurality of generally perpendicular fastener bores.

11. The hold-down of claim 10 wherein the each of said first and second plurality of angled fastener bores and a laterally associated one of the first and second plurality of generally perpendicular fastener bores is positioned at a different spaced distance along the length from the top of the body.

12. The hold-down of claim 9 further including a plurality of fasteners positioned in said first and second plurality of angled fastener positioning bores and said first and second plurality of generally perpendicular fastener bores.

13. The hold-down of claim 12 wherein alternating ones of said plurality of fasteners positioned in said first plurality of angled fastener positioning bores and said second plurality of angled fastener positioning bores enter the support at equal but opposing angles relative to a surface of the support.

14. The hold-down of claim 13 wherein each of said alternating ones of said plurality of fasteners positioned in said first plurality of angled fastener positioning bores and said second plurality of angled fastener positioning bores is angled toward a laterally associated fastener positioned in said first or second plurality of generally perpendicular fastener bores on an opposing side of said body.

15. The hold-down of claim 12 wherein the density of fasteners positionable in said angular and vertical mounting bores is about one per two square inches.

16. A hold-down securing a building support having a surface to a foundation, comprising:
- a body having a securing section enclosing a portion of an anchor bolt, said anchor bolt having a first end positioned in the foundation, the body having a first flange on one side of the securing section and a second flange on another side of the securing section defining a width, and a first end and a second end defining a length;
- a first plurality of fastener positioning bores positioned on the first and second flanges and having a cross-section parallel with the surface of the support when the securing section abuts the support; and
- a second plurality of fastener positioning bores positioned between the securing section and each of the first and second flanges and having a cross-section angled with respect to the surface of the support when the securing section abuts the support;
- wherein the first and second plurality of bores are spaced apart along said body and offset from each other, and wherein the number of said first plurality and second plurality of bores provides a density of at least one bore per two square inches.

17. The hold-down of claim 16 wherein the first plurality of the fastener positioning bores is positioned along a line running the length of the securing section directly between the first flange and the second flange.

* * * * *